United States Patent
Miyamoto et al.

(10) Patent No.: US 6,803,950 B2
(45) Date of Patent: *Oct. 12, 2004

(54) IMAGING SYSTEM WITH MEMORY AND CONTROL SYSTEM

(75) Inventors: Kazuyoshi Miyamoto, Kanagawa (JP); Katsuhiko Tsushima, Kanagawa (JP); Taku Kihara, Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,103

(22) Filed: Sep. 29, 1997

(65) Prior Publication Data

US 2002/0005903 A1 Jan. 17, 2002

(30) Foreign Application Priority Data

Sep. 30, 1996 (JP) .............................. 8-260010

(51) Int. Cl.$^7$ ................................. H04N 5/76
(52) U.S. Cl. ................ 348/231.6; 348/207.1; 348/211.4
(58) Field of Search .......................... 348/15, 143, 211, 348/212, 213, 233; 345/333, 352, 97; 700/83, 87, 97, 14.01, 14.05, 143, 211.99, 211.1, 211.2, 211.7, 211.6, 211.4, 211.3, 211.11, 211.8, 211.14, 231.2, 231.3, 207.1, 231.6, 231.99, 231.4

(56) References Cited

U.S. PATENT DOCUMENTS 5,479,206 A * 12/1995 Ueno et al. .................. 348/211
5,576,965 A * 11/1996 Akasaka et al. ............. 700/397
5,999,213 A * 12/1999 Tsushima et al. ........... 348/211

* cited by examiner

Primary Examiner—Wendy R. Garber
Assistant Examiner—Jacqueline Wilson
(74) Attorney, Agent, or Firm—Frommer Lawrence & Haug LLP; William S. Frommer; Bruno Polito

(57) ABSTRACT

An imaging system capable of easily and reliably adjusting the functions provided in the camera device and preventing mistaken adjustment of these functions. At a step S255, a specified parameter of a definition file or a user file is deleted or changed in values. A CPU judges whether or not an effective key is pressed. If the key is found to be pressed, the CPU proceeds to a step S256 and, if otherwise, the CPU dwells at a step S255. At a step S256, the CPU reads out image data of a parameter setting window from a disc drive based on the selected parameter or the definition file prevailing at a time point of pressing of the effective key. The CPU writes image data of the parameter setting window in a VRAM and causes a display image corresponding to the image data to be displayed on a display.

10 Claims, 34 Drawing Sheets

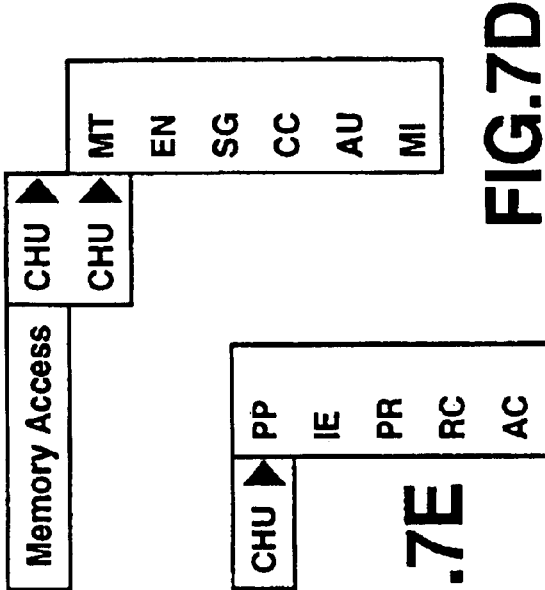
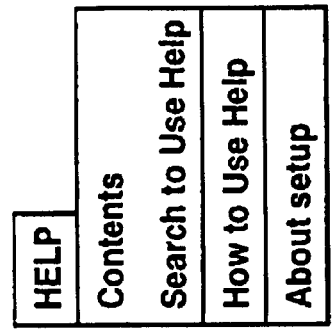
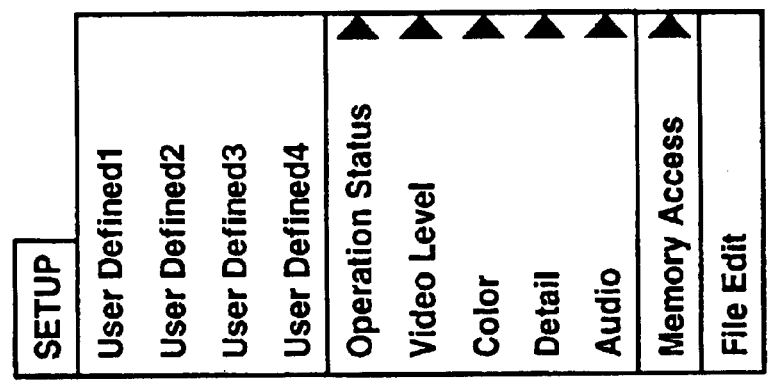
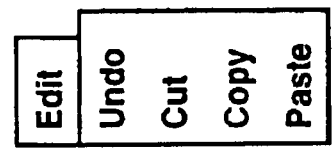
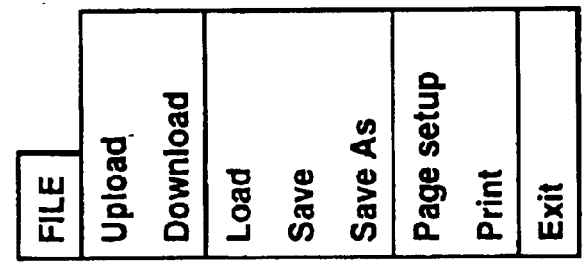

FIG. 8A

| Operation Status |
|---|
| Shutter |
| Filter |
| Bars/Test |
| Auto setup |

FIG. 8B

| Video Level |
|---|
| Iris |
| Master Black |
| Master Gain |
| Knee Satulation |
| Master V mod |
| Knee |
| White Clip |

FIG. 8C

| Color |
|---|
| Black |
| White |
| Black set |
| Flare |
| Black Shading H |
| Black Shading V |
| Black Shading H |
| Black Shading V |
| V Modu Shading |
| Matrix |
| Gamma |
| Black Gamma |

| Audio | Transmit |
|---|---|
| | Mic/Line |
| | Matrix Mix |
| | Matrix Output |
| | Incom |
| | Tracker |
| | Ext command |

FIG.9A

| Detail | Detail Level |
|---|---|
| | H/V H/L Ratio |
| | Gamma Mix Ratio |
| | R/G/B Mix |
| | Slim Detail |
| | Slant Detail |
| | H limitter |
| | V limitter |
| | Knee Aperuter |
| | Level Depend |
| | Crispending |
| | Detail area |
| | Slim tone |

FIG.9B

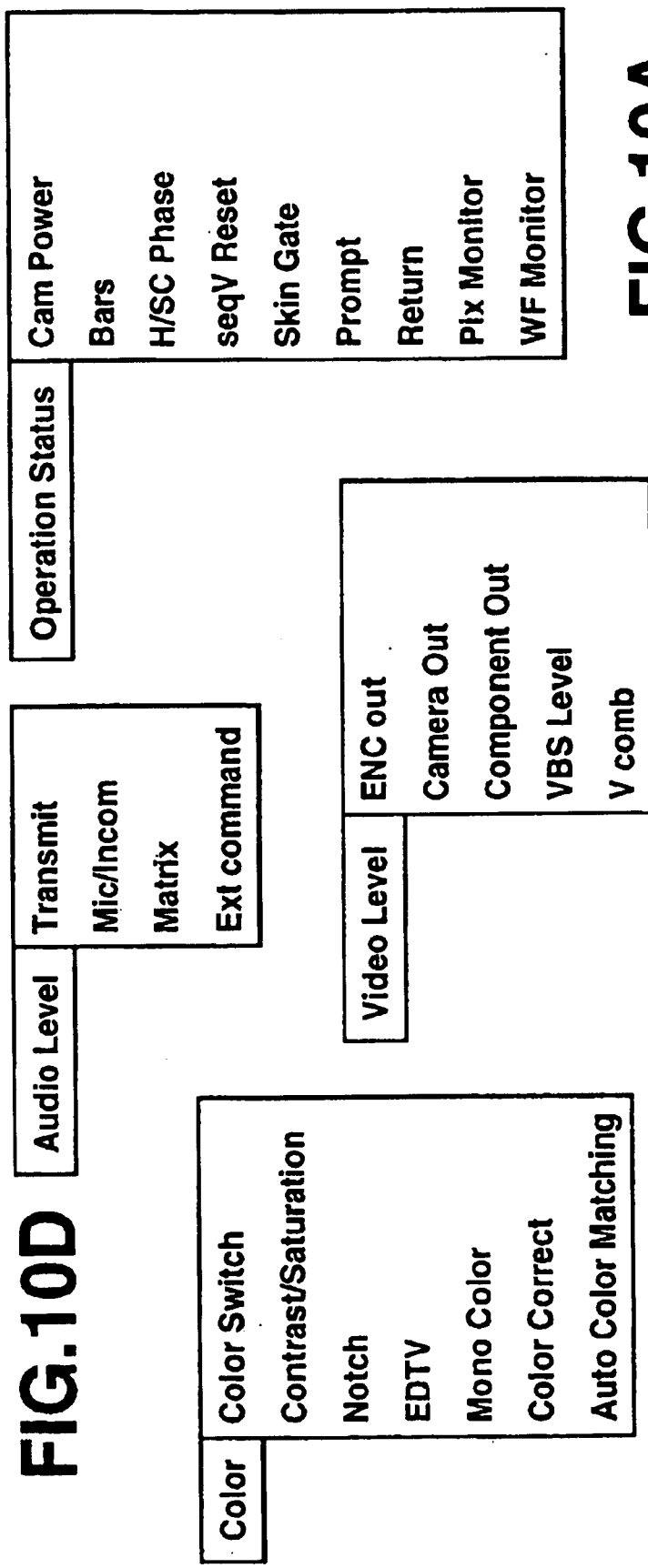

BVP500
710867 : CHU BARS : 2
720014 : MASTRE KNEE POINT : 1
720018 : MASTRE KNEE SLOPE : 1
710833 : AUTO IRIS : 2
710830 : CLOSE : 2
710817 : KNEE SAT : 2
7200AD : KNEE SAT POINT : 1
710815 : KNEE SAT SLOPE : 1
720015 : KNEE POINT R : 1

FIG.16

710816 : AUTO KNEE : OFF : −
7108A5 : AUTO KNEE MODE : NORM : −
710821 : WHT CLIP : ON : −
720014 : MASTRE KNEE POINT : 0 : 0 −100
720018 : MASTRE KNEE SLOPE : 0 : 0 −100
720015 : KNEE POINT R : 10 : 0 −100
720016 : KNEE POINT G : 20 : 0 −100
720017 : KNEE POINT B : 30 : 0 −100
720019 : KNEE SLOPE R : 40 : 0 −100
72001A : KNEE SLOPE G : 50 : 0 −100
72001B : KNEE SLOPE B : 60 : 0 −100
720020 : MASTER WHT CLIP : 20 : 0 −100
720021 : WHT CLP R : 10 : 0 − 100 ⎤
720022 : WHT CLP G : 20 : 0 − 100 ⎬ THIS PORTION IS DELETED
720023 : WHT CLP B : 30 : 0 − 100 ⎦
710826 : DTL : ON : −
72009B : DTL LVL : 60 : 0 −100
72009E : DTL H/V RATIO : 30 : 0 −100
72009F : DTL H/L RATIO : 85 : 0 −100
7200C3 : DTL GAMMA RATIO : 40 : 0 −100
72009D : DETL MIX RATIO : 30 : 0 −100
7200D9 : MIX RATIO V R−B : 30 : 0 −100
7108A3 : VDTL MODE : MIX : −
7200D8 : MIX RATIO V RB−G : 30 : 0 −100
7200D7 : SLIM DTL RATIO : 70 : 0 −100
7108A1 : H LIM : ON : −
72000C : DTL LIM : 70 : 0 −100
72000E : DTL B.LIM : 10 : 0 −100
72000D : DTL W.LIM : 50 : 0 −100
7108A2 : V LIM : ON : 0 −100
7200C7 : DTL LIM V : 70 : 0 −100
7200C9 : DTL B.LIM V : 10 : 0 −100

| MACHINE TYPE ID | COMMAND | PARAMETER ID | PARAMETER DATA |

FIG.29B

| MACHINE TYPE ID | PARAMETER ID | PARAMETER DATA | ⋯ |

FIG.29C

| MACHINE TYPE ID | LSIID | NUMBER OF BYTES USED | SET DATA | ⋯ |

FIG.29D

| MACHINE TYPE ID | PARAMETER ID | PARAMETER DISPLAY DATA | ⋯ |

FIG.29E

| MACHINE TYPE ID | DATA OF INSIDE OF DEVICE | ⋯ |

IMAGING SYSTEM WITH MEMORY AND CONTROL SYSTEM

BACKGROUND OF THE INVENTION

1. Field of the Invention

This invention relates to an imaging system for computer-controlling various functions, such as auto-iris, white balance or gamma correction provided on a camera device, and a method for controlling the imaging system.

2. Description of the Related Art

In a video camera, for example, there are a number of parameters that need to be set, such as white, black, gamma, knee or detail. Among the methods of setting these parameters, there are a method of adjusting the volume in the inside of a video camera, a method of incrementing or decrementing character data, such as numerals, displayed on a display loaded on a video camera by an incrementing button or a decrementing button, and a method of making adjustment using a remote controller device of a video camera.

Meanwhile, if there are a large number of parameters to be set, as in the case of a video camera, it is not expedient to set the parameters by the above-mentioned methods from the viewpoint of efficiency. Thus, there has been proposed an imaging system capable of controlling various functions, such as auto iris, white balance or gamma correction provided on the camera device by a computer.

In such imaging system, the above-mentioned various functions can be adjusted by a tool movable on the computer. However, because of numerous items of the functions, limitations are placed on the items that can be arranged in a window. Thus it is difficult for the user to adjust the functions arranged in plural windows.

Moreover, because of the numerous items of functions, it has been a frequent occurrence that the functions that should not be acted upon be adjusted or adjustment be done excessively beyond a prescribed range.

SUMMARY OF THE INVENTION

It is therefore an object of the present invention to provide an imaging system in which the functions provided on the camera device can be adjusted easily and reliably and in which it is possible to evade mistaken function adjustments.

In one aspect, the present invention provides an imaging system having at least one camera device for performing pre-set signal processing on an imaging signal generated responsive to imaging light of an object and a camera controller for adjusting various functions of the camera device. The camera controller includes operating means, memory means for holding on memory a file stating items of the controllable ranges of the functions and control means for reading out the file from the memory means for controlling the camera device so that the functions of the items stated in the file will be adjusted responsive to setting input of the operating means.

In another aspect, the present invention provides a method for controlling an imaging system comprising the steps of reading out a file stating items of controllable ranges of functions of a camera device, rewriting the read-out file responsive to operating setting of operating means and controlling the camera device so that the functions of the items stated in the rewritten file will be adjusted responsive to setting of the operating means.

With the imaging system according to the present invention, in which a file is read out from the memory means and the camera device is controlled so that the functions of the items stated in the file will be adjusted responsive to a setting input of the operating means, the risk of mistaken adjustment can be evaded by deleting an item of the function which, once adjusted, is not in need of re-adjustment.

With the imaging system according to the present invention, if in particular the file item is deleted based on setting of operating means, and the camera device is controlled for displaying the deleted setup item by netting display, an item that should not be inadvertently deleted can be visually appealed to the user thus possibly evading mistaken adjustment.

With the imaging system according to the present invention, if the controllable ranges of the functions of the file are changed based on the setting by the operating means, and the camera device is controlled for adjusting the above functions within the changed controllable ranges, adjustable ranges can be provided in meeting with the functions which differ from one camera device type to another.

With the imaging system according to the present invention, if in particular the controllable ranges of the functions of the file are changed based on the setting of the operating means, and the display means is controlled for displaying the changed controllable ranges, the adjustable ranges can be visually appealed to the user thus possibly evading mistaken adjustment.

With the controlling method for the imaging system according to the present invention, in which a file stating items of controllable ranges of functions of a camera device is read out from memory means, the read-out file is rewritten responsive to operating setting of operating means and the camera device is controlled so that the functions of the items stated in the rewritten file will be adjusted responsive to setting of the operating means, the risk of mistaken adjustment can be evaded by deleting an item of the function which, once adjusted, is not in need of re-adjustment.

With the controlling method for the imaging system according to the present invention, in which a file is read out from the memory means and the camera device is controlled so that the functions of the items stated in the file will be adjusted responsive to a setting input of the operating means, the risk of mistaken adjustment can be evaded by deleting an item of the function which, once adjusted, is not need of re-adjustment.

With the controlling method for the imaging system according to the present invention, if in particular the file item is deleted based on setting of operating means, and the camera device is controlled for holding the functions of the deleted item in initial setting, an item that should not be inadvertently deleted can be visually appealed to the user thus possibly evading mistaken adjustment.

If the controllable ranges of the functions of the file are changed based on the setting by the operating means, and the camera device is controlled for adjusting the above functions within the changed controllable ranges, adjustable ranges can be provided in meeting with the functions which differ from one camera device type to another.

With the controlling method for the imaging system according to the present invention, if in particular the controllable ranges of the functions of the file are changed based on the setting of the operating means, and the display means is controlled for displaying the changed controllable ranges, the adjustable ranges can be visually appealed to the user thus possibly evading mistaken adjustment.

BRIEF DESCRIPTION OF THE DRAWINGS

FIGS. 7A to 7F show an illustrative main pull-down menu that can be displayed by a menu bar of the connection structure window.

FIGS. 8A to 8C show an illustrative pull-down menu (CHU: camera head unit side) that can further be displayed from the pull-down menu.

FIGS. 9A and 9B show another illustrative pull-down menu (CHU: camera head unit side) that can further be displayed from the pull-down menu.

FIGS. 10A to 10D shows an illustrative pull-down menu (CHU: camera head unit side) that can further be displayed from the pull-down menu.

FIG. 16 illustrates an example of a user file.

FIG. 18 illustrates an example of a definition file.

FIG. 29 illustrates an example of a file format of various files and a transmission format used in a computer.

DESCRIPTION OF THE PREFERRED EMBODIMENTS

An embodiment of an imaging system of the present invention is explained in the order of the following contents.

1. Explanation of a Structure and an Operation of an Imaging System (see FIG. 1)
2. Explanation of Structure of a Computer shown in FIG. 1 (see FIG. 2)
3. Explanation of Control Operation by Main Routine of the Computer shown in FIG. 2 (see FIG. 3)
4. Explanation of an Initial Picture of an Operating System of the Computer shown in FIG. 2 (see FIG. 4)
5. Explanation of an example of a Connection Structure Window on Starting an Imaging System of the Computer shown in FIG. 2 (see FIG. 5)
6. Explanation of an Example of a Parameter Icon Window of an Imaging System (see FIG. 6)
7. Explanation of an Example of a Pull-down Menu of a Main Menu of the Imaging System (see FIG. 7)
8. Explanation of an Example of a Pull-down Menu for a Camera of the Imaging System (see FIGS. 8 and 9)
9. Explanation of an Example of a Pull-down Menu of a Camera Control Unit (CCU) of the Imaging System (see FIG. 10)
10. Basic Explanation of a Parameter Setting Picture of the Imaging System (see FIG. 11)
11. Explanation of the Operation of Main Processing by the Imaging System (see FIGS. 12 to 14)
12. Explanation of the Operation of Setup Processing by the Imaging system (see FIGS. 15 to 21)
13. Explanation of the Operation of Change Processing by a Switch of the Imaging system (see FIG. 22)
14. Explanation of the Operation of Change Processing by a Slide Lever of the Imaging system (see FIG. 23)
15. Explanation of the Operation of Change Processing by a Number of the Imaging System (see FIG. 27)
16. Explanation of the Operation of Change Processing by the Waveform of the Imaging System (see FIG. 28)
17. Explanation of Various file Formats and a Data Format for Transmission Used in an Imaging System (see FIG. 29)
18. Explanation of the Structure of a Data Converter shown in FIG. 1 (see FIG. 30)
19. Explanation of Control Operation of a Data Converter shown in FIG. 30 (see FIGS. 31 to 33)
20. Explanation of the Structure of a Video System of a Camera shown in FIG. 1 (see FIG. 34)
21. Explanation of the Structure of an Audio System of the Camera shown in FIG. 1 (see FIG. 35)

The following explanation is made from (1) on.

1. Explanation of a Structure and an Operation of an Imaging System (see FIG. 1)

Figure 1:
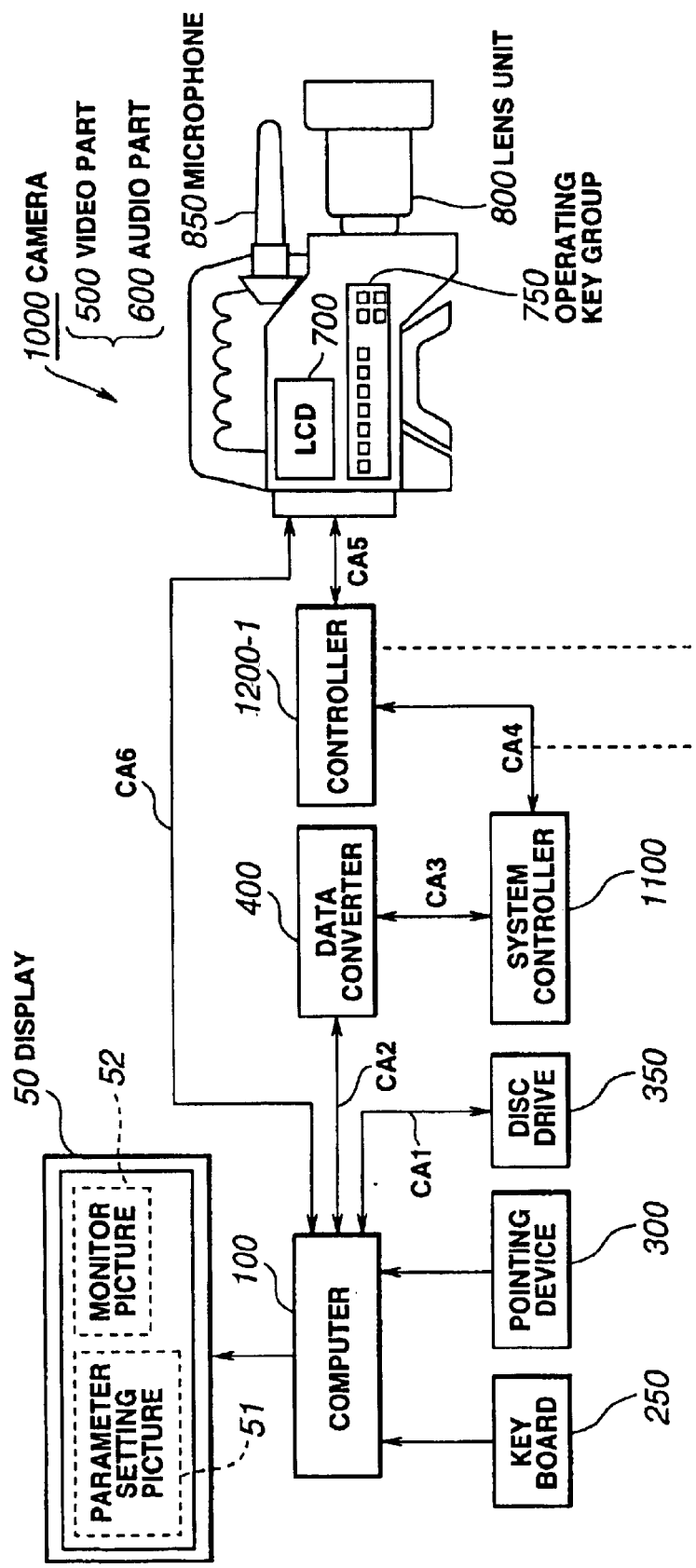
FIG. 1 shows a structure of an imaging system according to the present invention.

An imaging system shown in FIG. 1 includes a display 50 for displaying a parameter setting image 51 and a monitor picture 52, a computer 100 and a keyboard 250. The imaging system also includes a pointing device 300, a disc drive 350 for holding parameter setting picture data and program data on memory, and a data converter 400 for converting a protocol of data transmitted from the computer 100. The imaging system further includes a system controller 1100 for selectively supplying data outputted from the data converter 400 to a large number of controllers 1200-1, ... , 1200-n, not shown, and to camera devices 1000 respectively connected to these controllers 1200-1, ... , 1200-n. Only one camera device 1000 is shown.

The computer 100 and the disc drive 350 are interconnected by a cable CA1, while the computer 100 and the data converter 400 are interconnected by a cable CA2 and the computer 100 and the camera device 1000 are interconnected by a cable CA6. The data converter 400 and the system controller 1100 are interconnected by a cable CA3, while the system controller 1100 and the controllers 1200-1, . . . , 1200-n are interconnected by a cable CA4 and the camera device 1000 and the controllers 1200-1, . . . , 1200-n are interconnected by a cable CA5.

Similarly to a protocol converter 12, the data converter 400 becomes unnecessary if the system controller 100 has the function of protocol conversion.

The controllers 1200-1, . . . , 1200-n are termed general camera control unit (CCU) and take charge of control of the camera device 1000 and part of signal processing of video and audio signals obtained by the camera device 1000.

Thus, what is noteworthy is that the camera system made up of the controllers 1200-1, . . . , 1200-n and the camera devices 1000, shown in FIG. 1, is not used as a sole equipment in the same way as a camera-integrated VTR for domestic use is used. For this reason, the broadcasting station terms the camera devices 1000 shown in FIG. 1 a camera head unit (CHU).

FIG. 1 shows, as an example of the imaging system, an example in which a camera system made up of a CCU and a CHU is used. This, however, is merely illustrative and the imaging system may be designed as a video camera used as a sole equipment. In this case, the system controller 1100 or the controllers 1200-1, . . . , 1200-n shown in FIG. 1 may be dispensed with.

The pointing device 300 may, for example, be a digitizer, a mouse, a trackball, a cursor key or a joystick.

The camera device 1000 has a video system 500 and an audio system 600 in its inside, while having a liquid crystal display 700, a set of operating keys 750, a lens unit 800 and a microphone 850 on its outside.

In the current state of the art, the disc drive 350 is preferably a hard disc drive in view of the accessing speed. Of course, an optical disc having a high accessing speed, employing a recording/reproducing optical disc as a medium, or any other suitable magnetic disc drive, may also be used.

The monitor picture 52 is an imaging picture signal from the camera device 1000 displayed on a display surface of the display 50.

If a parameter is selected, parameter setting picture data, stored in the disc drive 350, is read out under control by the computer 100. The parameter setting picture data, read out from the disc drive 350, is supplied via cable CA1 and computer 100, to a display 50 so as to be displayed as a parameter setting picture 51 on the display surface of the display 50.

If parameter change is commanded on the parameter setting picture 51 by actuation from the keyboard 250 or the pointing device 300, the computer 100 causes the display state of a corresponding portion of the parameter data or the parameter setting picture 51 based on the operating information of the keyboard 250 or the pointing device 300.

The computer 100 causes changed parameter data (absolute value data) or data specifying variants (relative value data) to the data converter 400 over cable CA1. The parameter data or data specifying the variants (relative value data) transmitted to the data converter 400 are processed with protocol conversion and subsequently supplied to the system controller 1100 and thence supplied to the controllers 1200-1, . . . , 1200-n or to the camera device 1000.

The manner in which the system controller 1100 recognizes the controllers 1200-1, . . . , 1200-n or the camera device 1000 to which to send the parameter data will be clarified in connection with data transmission formats later explained with reference to FIG. 29. Here, the overall flow of the entire system is explained briefly.

During the time the parameters are set for the controllers 1200-1, . . . , 1200-n or the camera device 1000 with the parameter data, output image signals from the camera device 1000 are supplied to the computer 100. Of course, there are occasions wherein output video signals of the controllers 1200-1, . . . , 1200n are supplied to the computer 100.

Output video signals from the camera device 1000 are transiently seized by the computer 100 and thence supplied to the display 50 so as to be displayed as a monitor picture on the display surface thereof.

The internal structure and operation of each of the main components shown in FIG. 1 are now explained.

2. Explanation of Structure of a Computer Shown in FIG. 1 (see FIG. 2)

Figure 2:
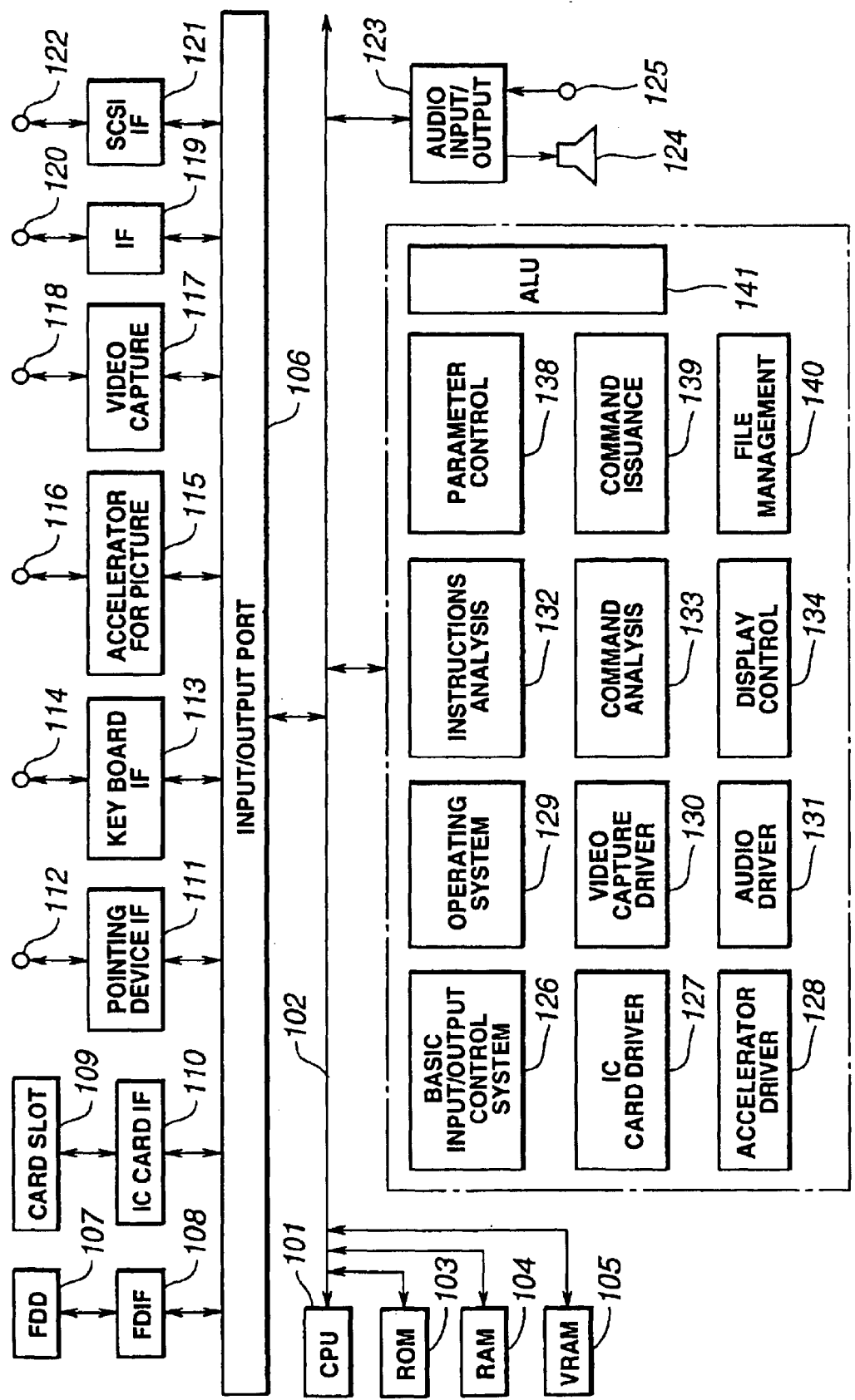
FIG. 2 shows an inner structure of the imaging system shown in FIG. 1.

FIG. 2 shows an illustrative internal structure of the computer 100 shown in FIG. 1.

[Connection and Structure]

To a CPU 101 of the computer 100 shown in FIG. 1 is connected a bus 102 made up of an address bus, a data bus and a control bus. To this bus 102 is connected an input/output port 106, to which are connected a ROM 103 having stored therein a basic input/output system and so forth, a working RAM 104, a video random access memory (VRAM) 105 for holding a video picture for display, a floppy disc interfacing circuit 108/floppy disc drive 107, a floppy disc interfacing circuit 110/card slot 109, an IC card interfacing circuit 110/card slot 109, a pointing device interfacing circuit 111/input/output terminal 112 connected to the pointing device 300, an input/output terminal an input/output terminal 114 connected to the keyboard 250 shown in FIG. 1, an accelerator 115 for picture display for effectuating picture display control to take the place of the CPU 101, an output terminal 116 connected to the display 50 shown in FIG. 1, a video capture circuit 117 for seizing video signals, an input terminal 118 connected to the camera device 1000 or the controllers 1200-1, . . . , 1200-n, shown in FIG. 1, an interfacing circuit 119 for communication, an input terminal 120 connected to the data converter 400 shown in FIG. 1, a small computer systems interface circuit (SCSI) 121, an input/output terminal 122 connected to a disc drive 350 shown in FIG. 1, an audio input/output circuit 123 and an input terminal 125 connected to the camera device 1000 or to the controllers 1200-1, . . . , 1200-n. To the audio input/output circuit 123 is connected a speaker 124.

As the above-mentioned interfacing circuit 119, an RS-232C interface or an RS-422 interface is used. The accelerator 115 for picture display has the ability of displaying a picture with, for example, 1280×1024 dots•1670000 colors on the display 50 shown in FIG. 1.

On power up of the computer 100, the basic input output system (BIOS) 126 stored in the ROM 103 is read out by the CPU 101. Then, program data of the operating system and program data of a driver are read out in this order from the disc drive 350 shown in FIG. 1.

If, on the display screen of the operating system, an imaging system, as later explained, is selected, program data of the imaging system is read out from the disc drive 350 by the CPU 101. Meanwhile, a block shown encircled by a chain-dotted line frame has the functions that can be owned by the CPU 101 by the fact that the above-mentioned operating system, driver and the imaging system are resident in the main memory of the CPU 101.

The basic input/output system (BIOS) 126 performs control of basic input/output such as acceptance and recognition of input data from the keyboard 250 shown in FIG. 1, acceptance and recognition of position data from the pointing device 300 shown in FIG. 1, or display on the display 50 shown in FIG. 1. Although the basic input output system (BIOS) 126 is usually stored as a conversion table in the ROM 103, it is resident in the present embodiment in the main memory of the CPU 101.

The IC card driver 127 is designed so that an IC card set on a card slot 109 can be used on the computer 100. The accelerator driver 128 is a special effect device for enabling data to be transmitted between the computer 100 and the accelerator for picture display 115. A video capture driver 130 is designed to transmit data between the video capture circuit 117 and the computer 100. An audio driver 131 is used for enabling data to be transmitted between the audio input/output circuit 123 and the computer 100.

The operating system 129 preferably implements graphical user interface in addition to management of file data and control of the disc drive 350. Example of the operating system 129 include MS-WINDOWS provided by MICROSOFT INC., SYSTEM 7.5, provided by APPLE COMPUTER or IS/2 provided by IBM. In the case o f an operating system not having a graphical user interface, the operating system may be implemented by the above-mentioned imaging system.

The imaging system includes instructions analysis means 132, command analysis means 134, parameter control means 138, command issuing means 139 and file management means 140.

The instructions analysis means 132 has the function of analyzing the contents of instructions by input data from the pointing device interfacing circuit 111 or the keyboard interfacing circuit 113.

The command analysis means 132 has the function of analyzing the contents of commands in the input data from the interfacing circuit 119.

The display control means 134 has the function of changing the contents of the VRAM 105 in accordance with the contents of the instructions analyzed by the instructions analysis means 132.

The parameter control means 138 has the function of changing the parameter data in accordance with the contents of the instructions analyzed by the instructions analysis means 132.

The command issuing means 139 has the function of issuing commands, in addition to the function of transmitting parameter data or variant-specifying data to the controllers 1200-1, . . . , 1200-n or to the camera device 1000 via the interfacing circuit 119 and the input/output terminal 120.

The file management means 140 has the function of holding and managing the above parameter data as file for each of the the controllers 1200-1, . . . , 1200-n or the camera devices 1000.

An ALU means 141 has the functions of executing arithmetic-logic operations such as changing the display contents or the parameter data change time in accordance with the contents of instructions analyzed by the instructions analysis means.

3. Explanation of Control Operation by Main Routine of the Computer Shown in FIG. 2 (see FIG. 3)

Figure 3:
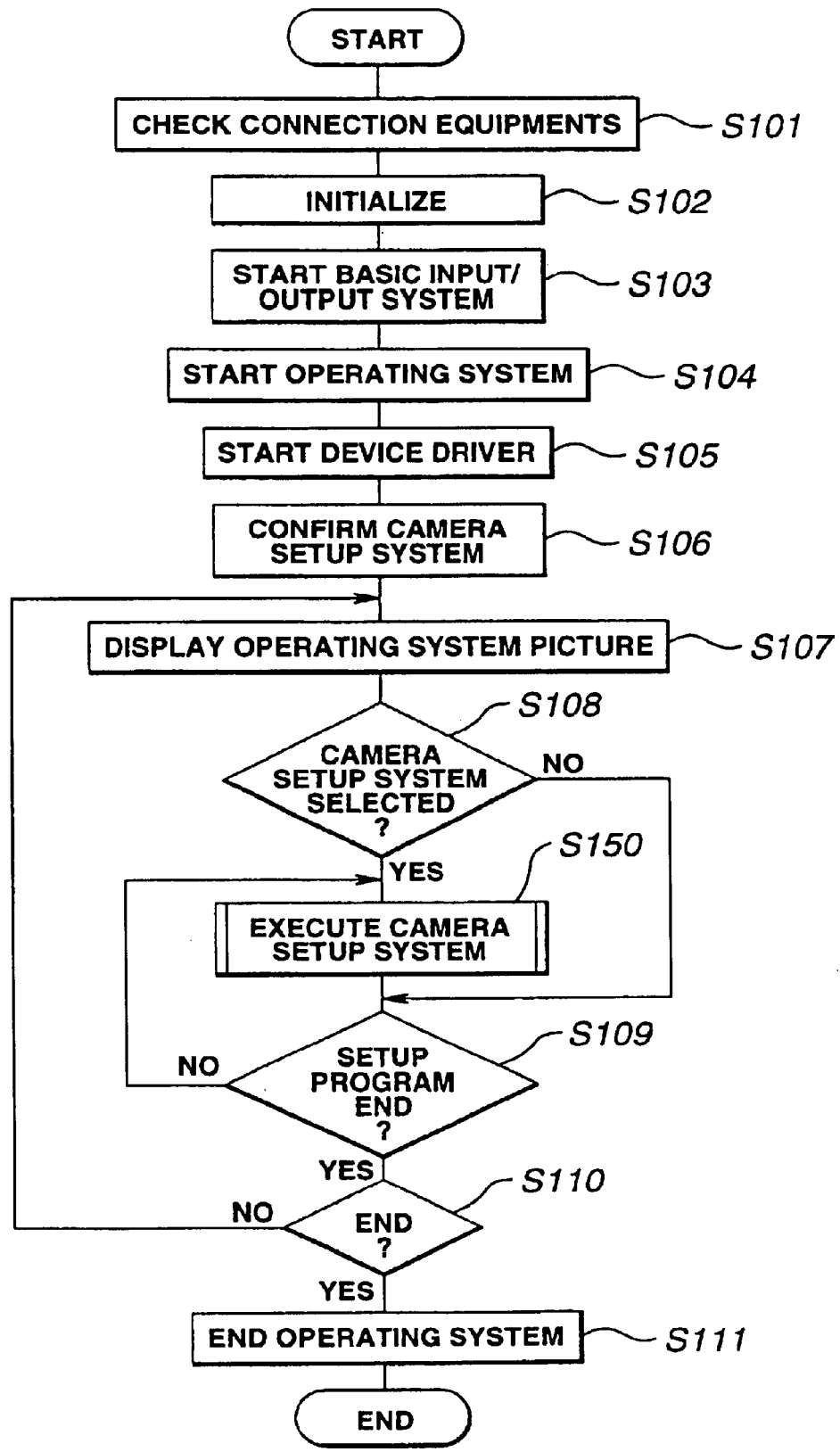
FIG. 3 is a flowchart for illustrating the operation of a main routine of the computer.

FIG. 3 is a flowchart for illustrating the control operation by the main routine of the computer shown in FIG. 2. This control operation is started on power up of the computer 100 shown in FIG. 2.

At step S101, an initializing program stored in the ROM 103 is read out. By this program, the CPU 101 proceeds to check the connection devices. Processing then transfers to step 102.

At step S102, the CPU 101 initializes the RAM 104 or the VRAM 105, before proceeding to step S103.

At step S103, the basic input/output system 126 is started. Processing then transfers to step 104.

At step S104, the basic input/output system 126 reads out the program data of the operating system 129 stored in the disc drive 350 shown in FIG. 1 to start the operating system 129. Processing then transfers to step S105.

At step s105, the operating system 129 reads out program data of the IC card driver 127 stored in the disc drive 350 shown in FIG. 1, accelerator driver 128, video capture 130 and audio driver 131 to start the drivers 127, 128, 130 and 131. Processing then transfers to step S106.

At step S106, the operating system 129 confirms the imaging system, before processing transfers to step S107. The term 'confirm' herein means reading out the information concerning program data registered in the operating system 126 from a file owned by the operating system 126. The information may, for example, be the fact that the imaging system is registered as a starting program, and the information concerning icons of the imaging system.

At step S107, the operating system 129 writes video data of the operating system 129 in the VRAM 105. The video data of the operating system 129 written in the VRAM 105 is sent to the display 5 shown in FIG. 1 via accelerator for video display 105 and output terminal 116. Processing then transfers to step S108. If the imaging system is registered in the operating system 129, an icon specifying the imaging system is also displayed.

At step S108, the operating system 129 judges whether or not the imaging system has been selected. If the result is YES, processing transfers to step S150 and, if the result is NO, processing transfers to step S109.

The term 'select' herein means the state in which a pointer image of the pointing device 300 is superimposed on the position of an icon of an imaging system on the image of the operating system 129 displayed on the display surface of the display 50 shown in FIG. 1 and subsequently the pointing device 300 is double-clicked by the operator. The term 'double-click' herein means that a button of the pointing device 300 is pressed twice.

At step S150, processing by the imaging system is executed, before processing transfers to step S109.

At step S109, the operating system 129 checks whether or not the setup program of the imaging system has come to a close. If the result is YES, processing transfers to step S110 and, if otherwise, processing reverts to step S150.

At step S10, the operating system 129 judges whether or not the program has come to a close. If the result is YES, processing transfers to step S111 and, if otherwise, processing reverts to step S107.

At step S111, the operating system 129 cancels the resident state of the CPU 101 on the main memory to terminate the operating system 129.

4. Explanation of an Initial Picture of an Operating System of the Computer Shown in FIG. 2 (see FIG. 4)

Figure 4A:
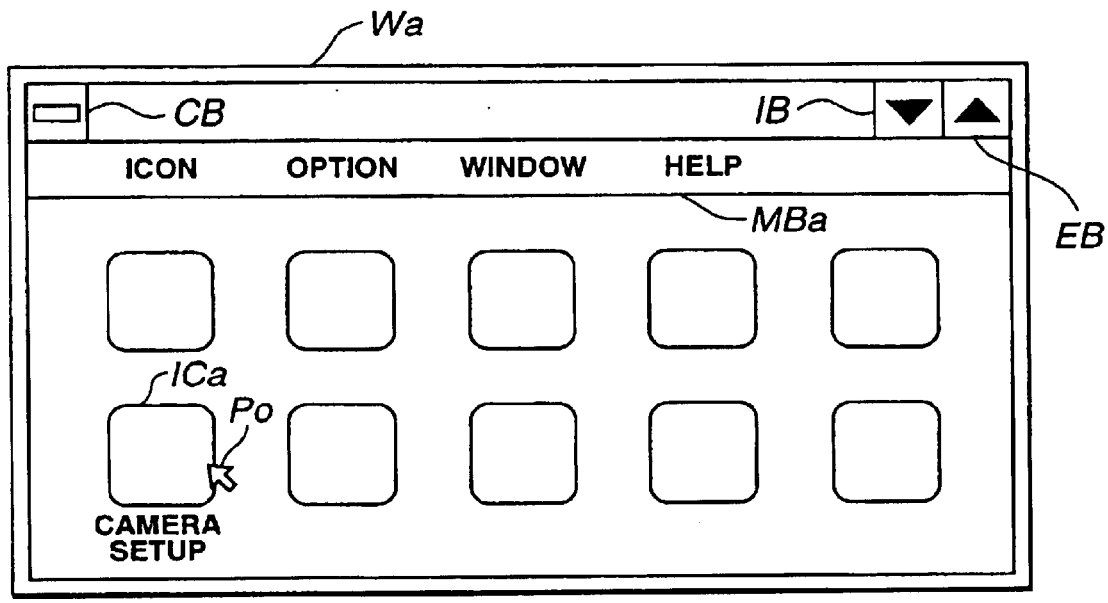
FIGS. 4A and 4B illustrate an illustrative initial picture of the computer.
Figure 4B:
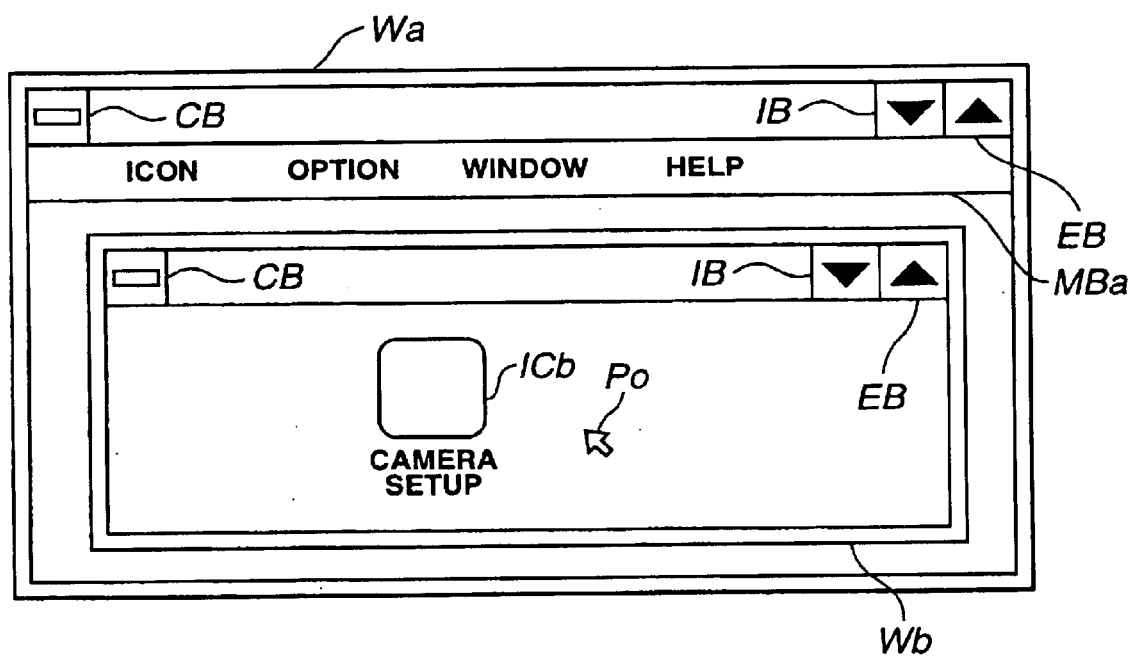

FIG. 4A illustrates a window picture Wa in the uppermost hierarchical layer by the operating system of the computer, and FIG. 4B illustrates the manner of starting the imaging system.

Referring to FIG. 4A, the window image Wa in the uppermost hierarchical layer is made up of a number of icons, inclusive of a button image CB for displaying a pull-down menu of the system, a button image IB for minimizing (converting to icon) the window image Wa, a button image EB for maximizing the window image Wa, a menu bar MBa for issuing various instructions to the operating system 129 and an icon ICa of the imaging system.

The letter images, such as 'icons', 'option', 'window' or 'help', which represent menu contents of the menu bar MBa, are used for displaying, on selection, the related commands by a pulldown menu form.

The methods of selection include a method of pressing a specified key of the keyboard 250 shown in FIG. 1 and subsequently using a cursor key of the keyboard, and a method of moving the pointing device 300 for moving a pointer Po to a position of a desired one of the above letters and clicking for selecting a desired command of the displayed pulldown menu.

Of the symbols affixed to the windows, lowercase letter a denotes the highest hierarchical order, with b, c, d, . . . , specifying sequentially lower hierarchical layers. Since the above-mentioned button images CB, IB and EB are necessarily included in the window image, only the symbols are affixed, while the explanation is omitted for simplicity.

In the window image Wa shown in FIG. 4A, the pointer Po is moved by the pointing device 300 for superimposing the pointer Po on the icon ICa having inscriptions 'camera setup' thereon. The button of the pointing device 300 is then clicked once. This displays the window Wb of the next lower layer on the display 50.

If, on the window image Wb shown in FIG. 4B, the pointer Po is moved by the pointing device 300, so that the pointer Po is superimposed on the icon ICa having inscriptions 'camera setup' thereon, and the button of the pointing device 300 is double-clicked, the imaging system is executed.

5. Explanation of an Example of a Connection Structure Window on Starting an Imaging System of the Computer Shown in FIG. 2 (see FIG. 5)

Figure 5:
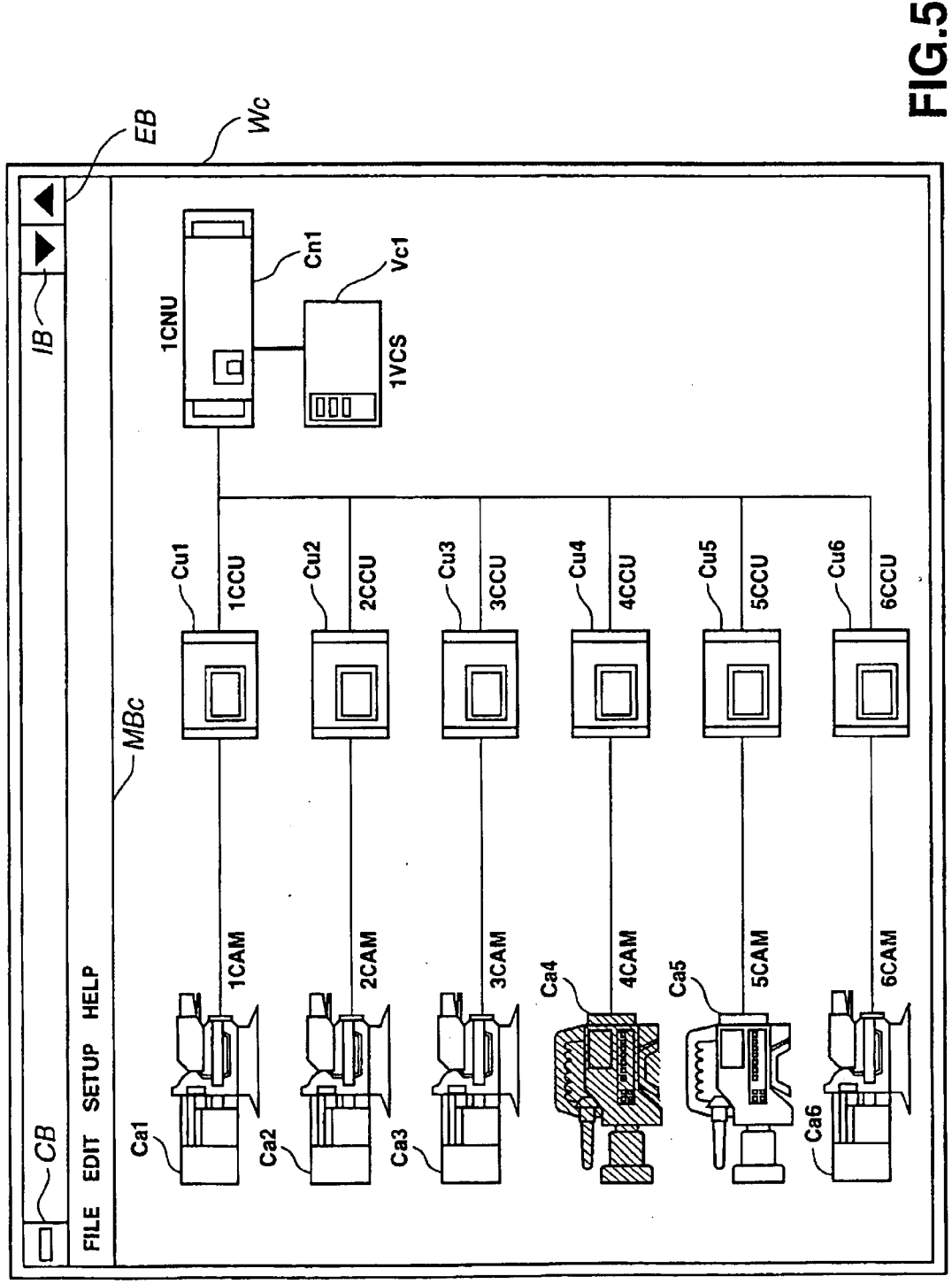
FIG. 5 shows an illustrative connection structure window displayed first on starting the imaging system.

FIG. 5 shows an example of a connection structure window on startup of the imaging system. The window image Wc can be displayed by reading a file comprised of the information on the connection structure generated on startup of the imaging system.

Referring to FIG. 5, this window image Wc includes camera icon images Ca1 to Ca6, CCU icon images Cu1 to Cu6 of the CCU connected to the camera icon images Ca1 to Ca6, respectively, an icon image Cn1 of a camera network unit (CNU) connected to the icon images Cu1 to Cu6 of the CCU, an icon image Vc1 of a video camera selector (VCS) and a menu bar MBc indicating 65 letters of 'FILE', 'EDIT', 'SETUP' and 'HELP'.

This window image Wc specifies that a camera system including six cameras, six CCUs connected to these six cameras, a CNU connected to these six CCUs and a VCS connected to this CNU is to be set up, that is a subject of setup. This connection state is confirmed by the imaging system on startup of the imaging system, as will be explained subsequently. It is one of the camera icon images Ca1 to Ca6 and CCU icon images Cu1 to Cu6 that is to be a subject of parameter setup.

For parameter setup for the desired camera or the CCU parameter, it suffices to actuate that the pointing device 300 for superimposing the above-mentioned pointer Po on the camera or CCU icon images Ca1 to Ca6 or Cu1 to Cu6 for which a parameter is desired to be set up and the button of the pointing device 300 is clicked once. If the button of the pointing device 300 is clicked once, the selected icon image Ca1 to Ca6 or Cu1 to cu6 of the camera or the CCU is in the display state such as in the colored state, specifying its selected state. In FIG. 5, it is the camera icon image Ca4 that has been selected.

Meanwhile, the CNU corresponds to the system controller 1100 shown in FIG. 1, while VCS indicates selective outputting of the six-series image signals supplied over the CNU.

6. Explanation of an Example of a Parameter Icon Window of an Imaging System (see FIG. 6)

Figure 6:
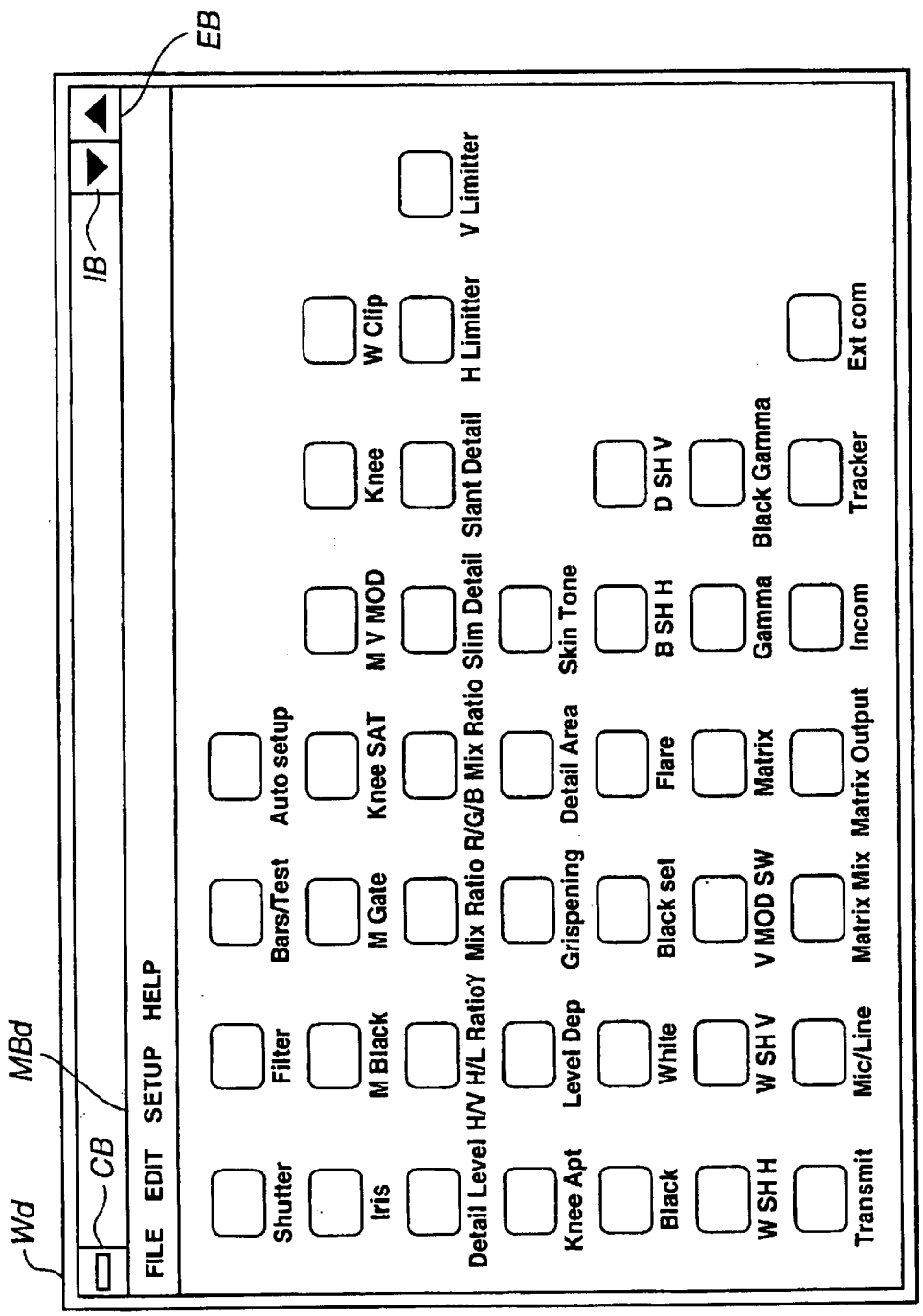
FIG. 6 shows an illustrative icon window of a parameter.

FIG. 6 illustrates a window image Magnetic disc displayed if, on the window Wc of the connection structure shown in FIG. 5, the camera icon images Ca1 to Ca6 are selected by clicking the button of the pointing device 30C once and subsequently a button of the pointing device 300 is clicked once, or the button is double-clicked with the button Po superposed on the camera icon images Ca1 to Ca6.

This window image Wd indicates, as an icon image, the one of the camera parameters that can be set up. The setup operation for the parameter specified by each icon image can be started by superposing the pointer Po on each icon image by actuation of the pointing device 300 and subsequently double-clicking the button of the pointing device 300.

The parameters indicated by the icon images are hereinafter explained.

Shutter (Shutter)

This is a parameter for adjusting the shutter speed of an electronic shutter. Examples of the adjustment modes include a step-switching shutter mode and an adjustment mode for a mode of adjusting the vertical resolution.

Filter (Filter)

This is a parameter for adjusting the ND filter or a CC filter to an appropriate filter for realizing proper depth of field by color temperature or brightness of the illumination.

Bars/Test (Burs/Test)

This is a parameter for setting an output of test signals from a camera or an output f a color bar.

Auto Setup (Auto-setup)

This is a parameter for controlling automatic adjustment of white balance, black balance, white shading, black shading, master black level, gamma level or knee level.

Iris

This is a parameter for adjusting an iris position (diaphragm or light stop value) of a lens.

M Black (Master Black)

This is a parameter for adjusting the black level of an image output signal.

M Gain Master Gain)

This is a parameter for adjusting the master gain if an image output responsive to the illuminance of an object.

Knee Sat (Knee Saturation)

This is a parameter for controlling level compression only of luminance components of a video signal.

M V MOD (Master V Modulation)

This is a parameter for adjusting the modulation shading in the vertical direction by concurrent adjustment of prime color signals.

Knee (Knee)

This is a parameter for controlling level compression of a high luminance portion of an input signal when the input signal level in the camera exceeds a pre-set value.

W Clip (White Clip)

This is a parameter for adjusting the limitations on the peak of the white level of a video signal.

Detail Level

This is an adjustment parameter for a correction value of a correction signal used for emphasizing the contour of the video signal.

H/V H/L Ratio (H/V H/L Ratio)

This is an adjustment parameter for adjusting the proportion of detail levels in the horizontal and vertical directions and for adjusting the burst frequency of the detail.

γMIX Ratio (Mixing Ratio)

This is a parameter for adjusting the mixing ratio of the correction signal for contour enhancement before and after gamma correction.

R/G/B MIX Ratio (Mixing Ratio)

This is a parameter for adjusting the mixing ratio of an original signal for generating a correction signal for contour enhancement.

Slim Detail (Slim Detail)

This is a parameter for adjusting the thickness of the contour by the correction signal for contour enhancement.

Slant Detail (Slant Detail)

This is a parameter for adjusting the contour in the oblique direction by the correction signal for contour enhancement.

H Limiter (H-limiter)

This is a parameter for adjusting the level on which operates a limiter for suppressing the level of the correction signal for enhancing the contour in the horizontal direction with respect to the white and black side levels of a video signal.

V Limiter (V-limiter)

This is a parameter for adjusting the level on which operates a limiter for suppressing the level of the correction signal for enhancing the contour in the vertical direction with respect to the white and black side levels of a video signal.

Knee Apt (Knee Aperture)

This is a parameter for adjusting the amount of correction by the correction signal for contour enhancement for a video signal exceeding the level of controlling the compression of the level of high luminance portion of an input signal in case the input signal level exceeds a pre-set value.

Level Dep (Level Depth)

This is a parameter for adjusting the level of a correction signal for contour enhancement for a signal exceeding a knee point.

Crispening (Crispening)

This is a parameter for adjusting the level of the correction signal for contour enhancement for removing the contour of a noise portion of the video signal.

Detail Area (Detail Area)

This is a parameter for adjusting the range and the gain on a screen corrected by the correction signal for contour enhancement.

Skin Tone (Skin Tone)

This is a parameter for adjusting the level of the correction signal for the video signal for enhancing the contour of the object of specified hue and saturation.

Black (Black)

This is a parameter for adjusting the black level between prime color signals for determining the black balance of respective channels of the prime color signals.

White (White)

This is a parameter for adjusting the white level between prime color signals for determining the white balance of respective channels of the prime color signals.

Black Set (Black Set)

This is a parameter for assuring a constant black level as a reference of each channel of the prime color signals.

Flair (Flair)

This is a parameter for assuring a flair balance of each channel of the prime color signals.

BSHH (Black Shading•H)

This is a parameter for adjusting the black shading on each channel of the prime color signals in the horizontal direction.

BSSH (Black Shading•V)

This is a parameter for adjusting the black shading on each channel of the prime color signals in the vertical direction.

WSHH (White Shading•H)

This is a parameter for adjusting white shading on each channel of the prime color signals in the horizontal direction.

WSHV (White Shading•V)

This is a parameter for adjusting white shading on each channel of the prime color signals in the vertical direction.

V MOD SH (V•Modulation Shading)

This is a parameter for adjusting modulation shading on each channel of the prime color signals in the vertical direction.

Matrix (Matrix)

This is an adjustment parameter for correcting the basic colors of the prime color signals for obtaining an optimum color tone.

Gamma (Gamma)

This is a gamma correction adjustment parameter for correcting non-linear characteristics of a television Braun tube at the time of conversion from electricity to light.

Black Gamma (Gamma)

This is a parameter for adjusting the black gamma for improving gradation characteristics in the vicinity of the black level.

Transmit (Transmit)

This is a parameter for selecting the transmission system between the camera and the CCU.

Mic/Line (Microphone/Line)

This is a parameter for selecting whether audio signals should be entered to the camera by a microphone or over a line.

Matrix Mix (Matrix Mix)

This is a parameter for setting a mixing signal of an external audio signal entered to a camera and a mixing ratio.

Matrix Output (Matrix Output)

This is a parameter for selecting a program signal in the camera and for adjusting an output level of the external audio signal.

Income (Income)

This is a parameter for setting the external audio signal entered to the camera.

Tracker (Tracker)

This is a parameter for setting the external speech signal entered to a camera.

Ext Command (External Command)

This is a parameter for setting the response on/off to a command supplied from outside to the camera.

7. Explanation of an Example of a Pull-down Menu of a Main Menu of the Imaging System (see FIG. 7)

FIGS. 7A to 7F show an example of a pulldown menu displayed on superposing a pointer Po on 'FILE', 'EDIT', 'SETUP' or 'HELP' of the menu bars MBc or MBd of the window image Wc shown in FIG. 5 or the display window Wd shown in FIG. 6 and subsequently clicking the button of the pointing device.

FIG. 7A shows a pulldown menu displayed on selecting the 'FILE'. As shown therein, commands that can be selected on selecting the 'FILE' are as follows:

Up Load (Upload)

This is a command for reading in all parameter data from the camera or CCU connected in circuit.

Down Load (Downloading)

This is a command for setting al parameter data for the camera or CCU connected in circuit.

Load (Load)

This is a command for reading in all parameter data recorded as a file from a floppy disc set on a floppy disc drive 107, a disc drive 350 shown in FIG. 1 or an IC card set in a card slot 109.

Save (Save)

This is a command for saving parameter data as a file on a floppy disc set on a floppy disc drive 107, a disc drive 350 shown in FIG. 1 or an IC card set in a card slot 109.

Save as (Save as)

This is a command for saving a read-in file under a separate name.

Page Setup (Page Setup)

Print (Print)

This is a command for printing file data by a printer.

EXIT (Exit)

This is a command for canceling the selection mode of the pull-down menu.

The above commands can be selected by superposing the pointer Po on the command letters while pressing the button of the pointing device 300 and then releasing the button. The commands, items or the parameters of the pulldown menu can be selected all in this manner.

FIG. 7B shows a pulldown menu displayed on selection of 'EDIT'. As shown therein, commands that can be selected on selecting the 'EDIT' are as follows:

Undo (Undo)

This is a command for restoring the processing by a command once issued to a directly previous state.

Cut (Cut)

This is a command for cutting video data of a designated area.

Copy (Copy)

This is a command for copying designated data or image data.

Paste (Paste)

This is a command for inserting designated data or picture data in a desired position.

FIG. 7C is a pulldown menu displayed on selecting 'SETUP'. As shown therein, commands that can be displayed on selecting the 'SETUP' are as follows:

User Defined 1 to 4 (User-defined 1 to 4)

These are commands as set by the user for calling out the control commands in the window for processing in accordance with the called-out commands.

Operation Status (Operation Status)

Video Level (Video Level)

Color (Color)

Detail (Detail)

Audio (Audio)

The above five commands have pull-down menus of still lower hierarchical order.

Memory Access (Memory Access)

This is a command for accessing the camera or CCU memories.

File Edit (File Edit)

This is a command for editing file data of read-out parameters data.

FIG. 7D shows a pull-down displayed on selecting 'Memory Access'. As shown therein, the commands that can be selected on selecting 'Memory Access' are as follows:

CCU (Camera Control Unit)

This command has a pulldown menu as shown in FIG. 7.

FIG. 7E shows a pulldown menu displayed on selecting 'camera control unit (CHU)' in the pulldown menu shown in FIG. 7D.

FIG. 7F shows a pulldown menu on selecting 'HELP'. This 'HELP' is a menu for displaying a variety of information items concerning the imaging system.

8. Explanation of an Example of a Pull-down Menu for a Camera of the Imaging System (see FIGS. 8 and 9)

FIGS. 8A, 8B, 8C, 9A and 9B illustrate pulldown menus displayed on selecting the camera in the window image Wc shown in FIG. 5 and subsequently selecting 'Operation Status', 'Video Level', 'Color', 'Audio' and 'Detail' in the pulldown menu displayed on selecting 'SETUP' shown in FIG. 7C. The processing on selection of the respective parameters of these pulldown menus are similar to that by selection of the icon image shown in FIG. 6 except only the display configuration. Therefore, reference is had to the explanation with reference to FIG. 6 for details.

9. Explanation of an Example of a Pull-down Menu of a Camera Control Unit (CCU) of the Imaging System (see FIG. 10)

FIGS. 10A, 10B, 10C and 10D are illustrative views showing pulldown menus displayed on selecting 'Operation Status', 'Video Level', 'Color' and 'Audio level' in the pulldown menu on first selecting the CCU in the window image Wc shown in FIG. 5 and then selecting the 'SETUP' shown in FIG. 7. The processing by selection of the respective items of these pulldown menus is not shown in detail. It is noted that processing may also be by icon image selection as in FIG. 8.

FIG. 10A shows a pulldown menu displayed on selecting 'Operation Status'. As shown therein, parameters that can be selected on selecting 'Operation Status' are as follows:

Cam Power (Camera Power)

This is a parameter for setting power supply on/off to the camera.

Bars (Bars)

This is a parameter for setting the outputting of a color bar from the CCU.

H/SC Phase (H/SC Phase)

This is a parameter for adjusting the phase of horizontal synchronization signals and subcarrier signals.

SeqV Reset (Sequential•V•Reset)

This is a parameter for adjusting the reset timing at the time of a sequential output mode to a waveform monitor or a picture monitor.

Skin Gate (Skin Gate)

This is a parameter for controlling effective area display of skin details displayed on a picture monitor.

Prompt (Prompter)

This is a parameter for setting a prompter.

Return (Return)

This is a parameter for setting a return signal.

Pix Monitor (Picture Monitor)

This is a parameter for setting an output signal to a picture monitor.

WF Monitor (Waveform Monitor)

This is a parameter for setting an output signal to a waveform monitor.

FIG. 10B shows a pulldown menu displayed on selecting 'Video level'. As shown therein, parameters that can be selected on selecting 'Video level' are as follows:

ENC out (Encoder Out)

This is a parameter for adjusting composite signals outputted by the CCU.

Camera Out (Camera Out)

This is a parameter for adjusting the level of an input signal from a camera.

Component Out (Component Out)

This is a parameter for adjusting the component signals outputted by the CCU.

VBS Level (VBS Level)

This is a parameter for adjusting the VBS signal on an optional substrate of a color corrector.

Y Comb (VBS Level)

This is a parameter for adjusting a comb filter for combating the problem of cross-color of the VBS signal.

FIG. 10C shows a pulldown menu displayed on selecting 'Color'. As shown therein, parameters that can be selected on selecting 'Color' are as follows:

Color Switch (Color Switch)

This is a parameter for setting color on/off.

Contrast/Saturation (Contrast/Saturation)

This is a parameter for adjusting linearly of luminance components and the color level of an output signal of the CCU.

Notch (Notch)

This is a parameter for setting the processing for removing signals of a particular frequency from image signals.

EDTV

This is a parameter for making adjustments on items concerning EDTV.

Mono Color (Monochromatic Color)

This is a parameter for adjusting the color hue of luminance signals outputted by the CCU with respect to the mono-color functions of mixing single color hue chroma signals.

Color Correct (Color Corrector)

This is a parameter for adjusting correction conditions for a color corrector capable of correcting specified color hues.

Auto Color Matching (Automatic Color Matching)

FIG. 10D shows a pulldown menu displayed on selecting 'Audio Level'. As shown therein, parameters that can be selected on selecting 'Audio Level' are as follows:

Transmit (Transmit)

This is a parameter for selecting the transmission system between the camera and the CCU.

Mic/Incom (Microphone/Income)

This is a parameter for setting the microphone and an external audio input.

Matrix (Matrix)

This is a parameter for setting a mixing signal of an external audio input and setting the mixing ratio.

Ext command (External Command)

This is a parameter for setting on/off of communication of commands with outside.

10. Basic Explanation of a Parameter Setting Picture of the Imaging System (see FIG. 11)

Figure 11:
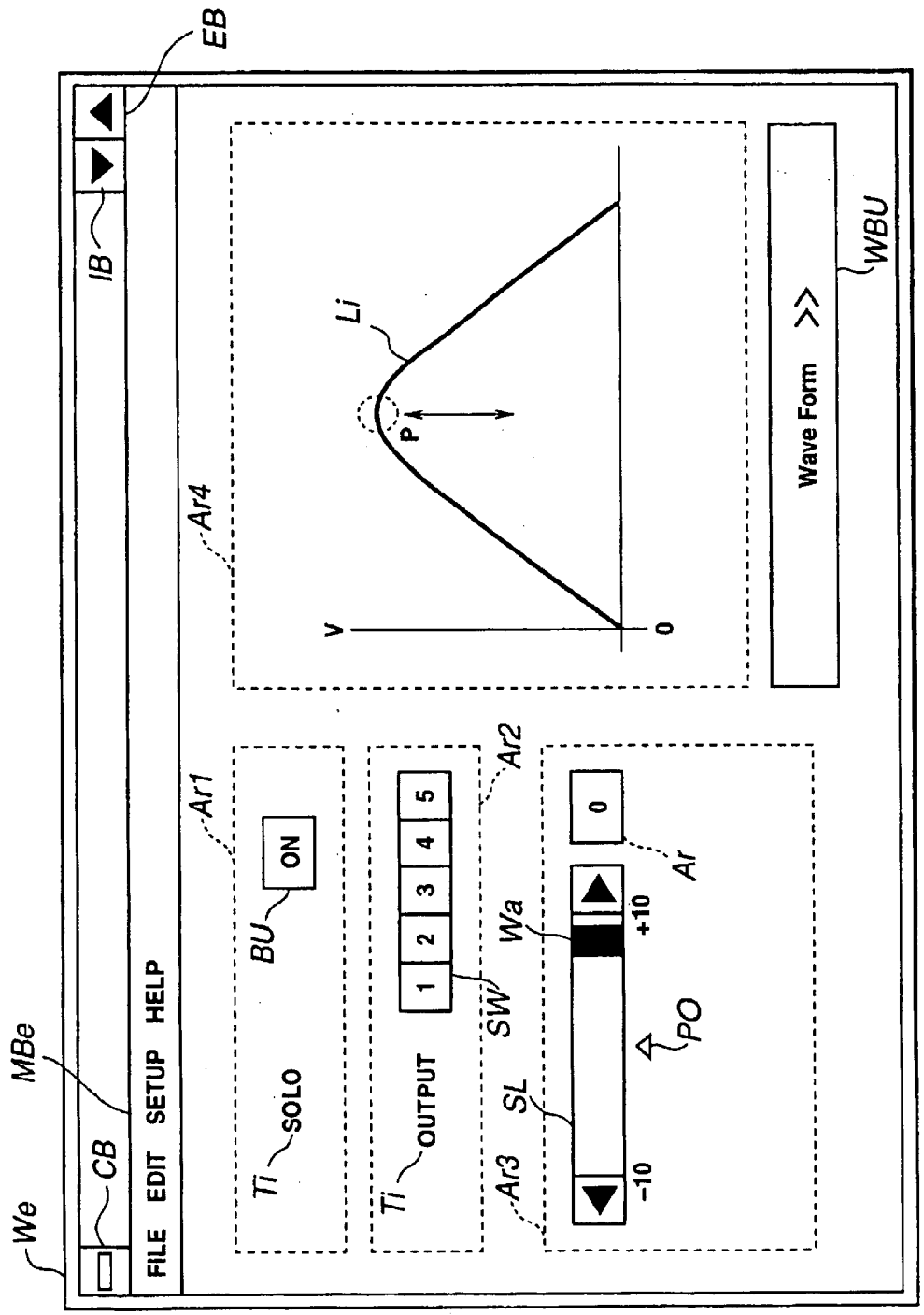
FIG. 11 illustrates the fundamentals of a parameter icon window or a parameter setting window that that can further be displayed from the pull-down menu.

FIG. 11 is an illustrative view showing the fundamentals of a parameter setting window We as a parameter setting image for setting parameters of the camera or the CCU as described above.

The parameter setting window We shown in FIG. 11 is displayed by first superposing the pointer Po n the icon image shown in FIG. 6 and then clicking the button of the pointing device 300 twice, or by superposing the pointer Po on a letter specifying an item of the pulldown menu shown in FIGS. 8 to 10 while the button of the pointing device 100 is kept pressed and then by releasing the button. The monitor image shown in FIG. 1 is not shown for simplicity.

For facility in understanding, the parameter setting window We is shown for the case of setting the audio signals. In an area Ar1 are displayed a title image Ti and a button image BU. The title reads 'SOLO' specifying that the selected audio signal is outputted by itself. The on/off state of the button BU is switched by first superimposing the pointer Po on the button BU and then clicking the button of the pointing device 300. That is, various sorts of data are set on the buttons BU and are sequentially switched each time the pointing device 300 is clicked. Since the button is on in the illustrated embodiment, the 'SOLO' specified by the title image Ti is on, that is valid.

In the area Ar2, the title image Ti and switch images SW of from "1" to "5" are shown. The indication 'OUTPUT' of the title image Ti means an 'output terminal'. In the present embodiment, the numerical values of from "1" to "5" specify the numbers of the output terminals of the audio signals. By first superposing the pointer Po on any one of the switches SW and clicking the button of the pointing device 300, one of the switches SW is selected, and the numerical values of from "1" to "5" specified by the switch SW, that is the numbers of the output terminals, are selected.

In an area Ar3, there is shown a slide lever image SL, whereas, in an area Ar indicated by a broken line, there are shown images of numerical values. The slide lever image SL is made up of a lever image Ma and a reference point image PO. The reference point image PO is displayed at a mid position or at a position prior to change if the setting value is of an absolute value indication or of a relative value indication, respectively. On both ends of the slide lever image SL are displayed a numerical value image specifying a negative maximum value and a numerical value image specifying a positive maximum value.

If the pointing device 300 is moved, with the pointer Po superposed on the lever image Ma, with the button of the pointing deice 300 kept in the pressed-down state, the lever image Ma is moved on the image in an amount corresponding to the amount of movement of the device 300. In the area Ar, there is displayed a numerical value corresponding to the amount of movement of the pointing device 300.

If, after the pointer Po is superposed on the button image WBU displayed below an area Ar4, the button of the pointing device 300 is clicked, a graph corresponding to the parameter currently being set, or a waveform figure image Li, as shown, is displayed. If the button of the pointing device 300 is clicked in this state, with the pointer Po superposed on the button image WBU, the waveform figure image Li, so far displayed in the area Ar4, ceases to be displayed.

What is crucial is that, if, after superposing the pointer Po on a point P in the waveform figure image Li specified by a broken line circle, the button of the pointing device 300 is pressed and, as this state is kept, the pointing device 300 is moved (dragged) vertically, the waveform figure image Li is extended or contracted in an up-and-down direction specified by a solid-line arrow in an amount corresponding to the amount of movement of the pointing device 300, that the value of the parameter data held in the computer is varied, that the lever Ma of the slide lever SL is moved, and that the numerical value image displayed in the area Ar is changed. These control operations are taken charge of by the instructions analysis means 132, display control means 134 and the parameter control means 138 previously explained with reference to FIG. 2.

That is, the operator can control parameters of the camera or the CCU by the imaging system having the graphical user interface as shown in FIG. 11.

11. Explanation of the Operation of Main Processing by the Imaging System (see FIGS. 12 to 14)

Figure 12:
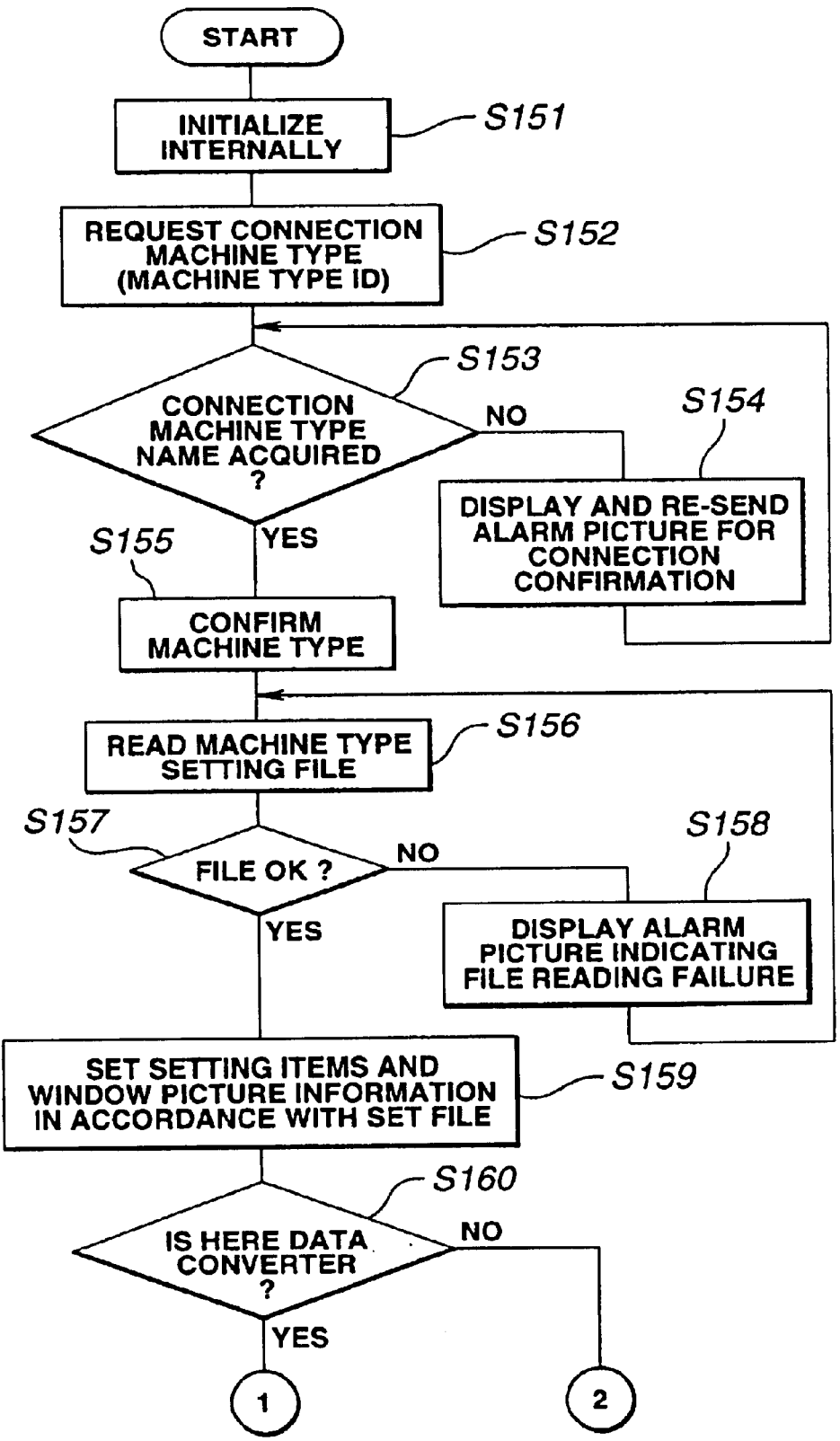
FIGS. 12 to 14 collectively show a flowchart showing main processing of the imaging system.
Figure 13:
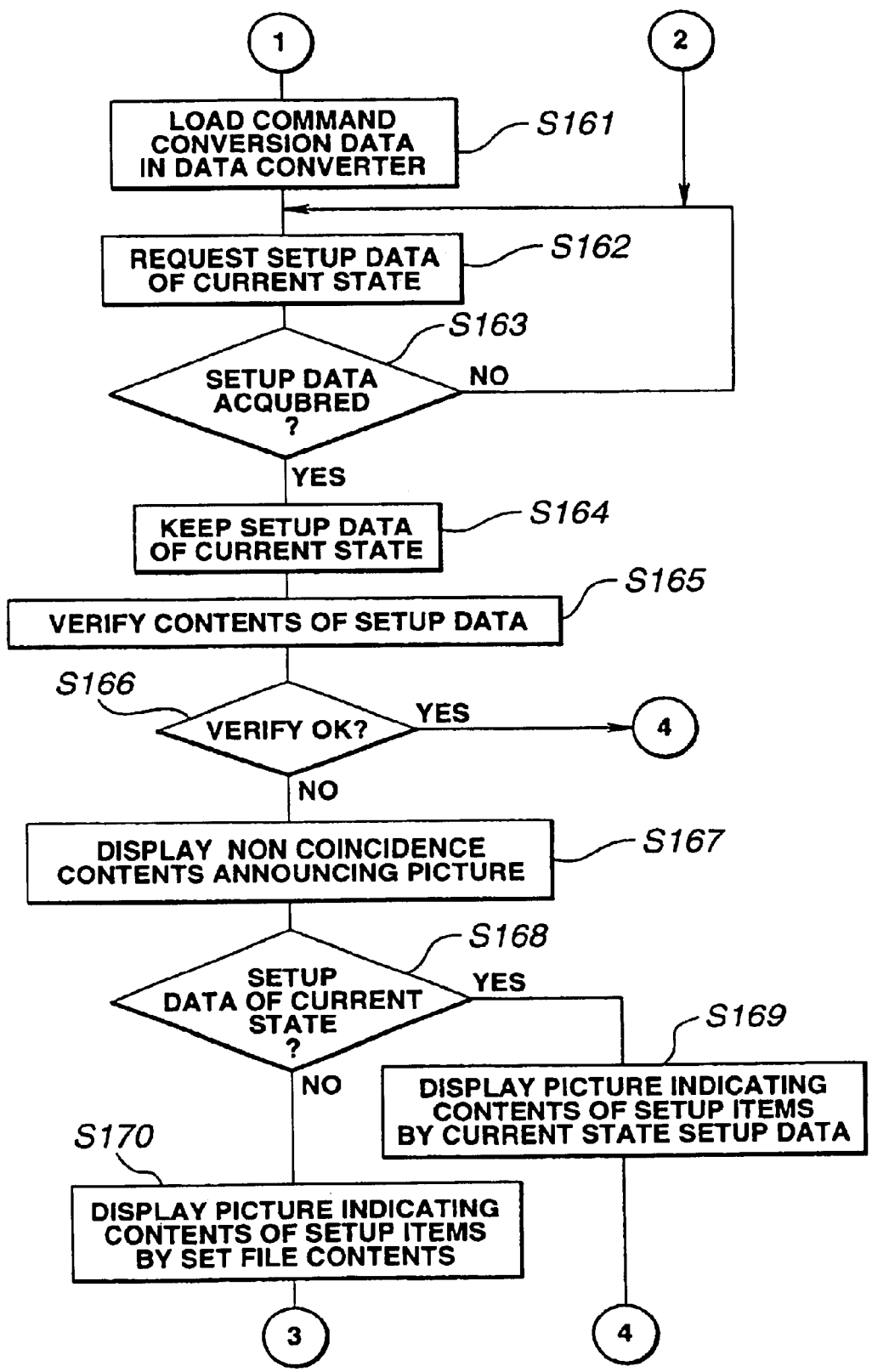
Figure 14:
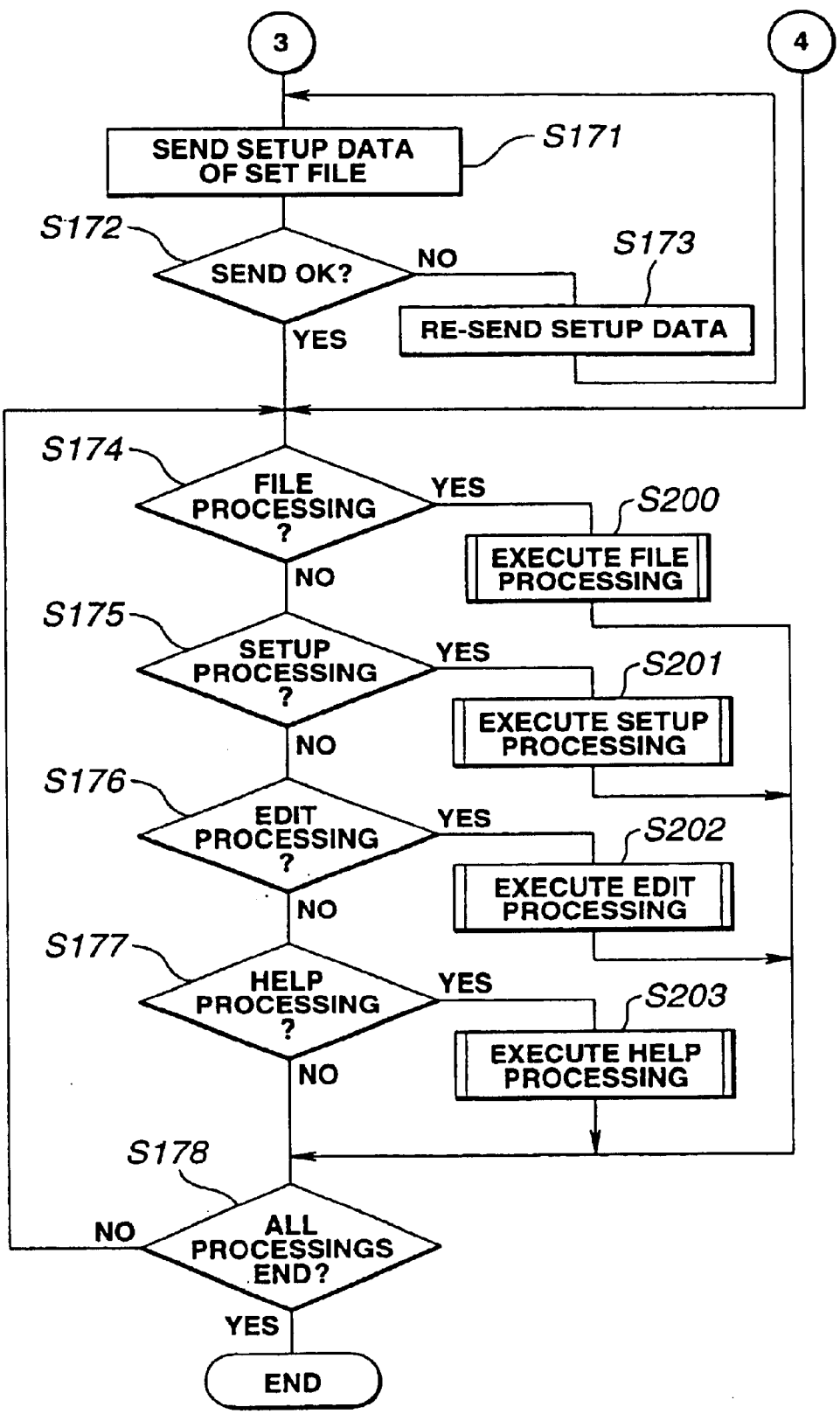

FIGS. 12 to 14 collectively show a flowchart for illustrating main processing by the imaging system of step S150 of the flowchart shown in FIG. 3.

At step S151 of FIG. 12, the parameter control means 138 initializes the RAM 103 and so forth. The file management means 140 reads out image data of the connection structure window shown in FIG. 5 from the disc drive 350 shown in FIG. 1. The display control means 134 writes image data of the connection structure window in the VRAM 105. The image data of the connection structure window, written in the VRAM 105, is supplied via accelerator for image display 115 and output terminal 116 to the display 50 shown in FIG. 1 so as to be displayed as an image on the display screen of the display 50. Processing then transfers to step S152.

If, at step S152, the operator selects, on the connection structure window shown in FIG. 5, one of the icon images Ca1 to Ca6 or Cu1 to Cu6 of the cameras or CCUs, the command issuing means 152 issues a command requesting transmission of data of the machine type ID data to the camera device 1000 or the controllers 1200-1, . . . , 1200-n. Processing then transfers to step S153.

At step S153, the command issuing means 139 judges whether or not the machine type ID data has been acquired. If the result is YES, processing transfers to step S155 and, if otherwise, processing transfers to step S154.

At step S154, the display control means 134 writes on the VRAM 105 alarm image data used for announcing to the operator the acknowledgment of whether or not the camera device 1000 or the controllers 1200-1, . . . , 1200-n as specified by the operator has been connected in circuit. The alarm image data, written in the VRAM 105, is displayed as an image on a display screen of the display 50 shown in FIG. 1. On the other hand, the command issuing means 139 issues a command specifying request of transmission of the machine type ID data to the camera device 1000 or the controllers 1200-1, . . . , 1200-n shown in FIG. 1. Processing then transfers to step S155.

At step S155, the file management means 402 confirms the acquired machine type ID data. This confirmation is a processing of limiting the machine type setting files corresponding to the acquired machine type ID data. Processing then transfers to step S156.

At step S156, the file management means 140 reads in a machine type setting file corresponding to the machine type ID data confirmed at step S155 from the disc drive 350 shown in FIG. 1. Processing then transfers to step S157.

At step S157, the file management means 140 judges whether or not regular file data has been read from the machine type setting file. If the result is YES, processing transfers to step S159 and, if otherwise, to step S158.

At step S158, the display control means 134 writes in the VRAM 1105 alarm image data specifying that file readout has failed. The alarm image data written in the VRAM 105 is displayed as an image on the display surface of the display 50 shown in FIG. 1. Processing then transfers to step S159.

At step S159, the parameter setting means 138 sets setting items, based on the machine type setting file data read out by the file management means 140, whilst the display control means 134 writes window image data on the VRAM 105 based on the machine type setting file data. The alarm image data written in the VRAM 105 are displayed as an image on the display surface of the display 50 shown in FIG. 1. Processing then transfers to S160.

At step S160, the command issuing means 139 issues a command for machine type confirmation to the data converter 400 shown in FIG. 1. The command issuing means 139 judges whether or not connection has been made to the data converter 400 depending on whether or not there is response to the command. If the result is YES, processing transfers to step S161 and, if otherwise, to step S162 of the flowchart shown in FIG. 13.

At step S162, the command issuing means 139 loads command conversion data to the data converter 400 shown in FIG. 1. Processing then transfers to step S162.

At step S162, the command issuing means issues a command specifying request of transmission of setup data specifying the current setup state to the camera device 1000 or to the controllers 1200-1, . . . , 1200-n shown in FIG. 1. Processing then transfers to step S163. It is noted that the setup data represent plural parameters for each of the camera device 1000 and the controllers 1200-1, . . . , 1200-n.

At step S163, the command issuing means judges whether or not the setup data has been acquired. If the result is YES, processing transfers to step S163 and, if otherwise, processing reverts to step S162.

At step S164, the file management means 140 holds on memory the transmitted current setup data as file in the RAM 103. Processing then transfers to step S166.

At step S165, the file management means 140 verifies the contents of the setup data stored in the RAM 103 before proceeding to step S166.

At step S166, the file management means 140 judges whether or not the contents of the transmitted setup data coincide with the contents of the setup data stored in the RAM 103, based on the verified results of the contents of the setup data stored in the RAM 103 to. If the result is YES, processing transfers to step S174 of the flowchart shown in FIG. 14 and, if otherwise, to step S167.

At step S167, the display control means 134 writes non-coincidence contents announcing image data specifying the contents of non-coincidence in the VRAM 105. The non-coincidence contents announcing image data written in the VRAM 105 is displayed as an image on the display screen of the display 50 shown in FIG. 1. Processing then transfers to step S168.

At step S168, the command analysis means 133 judges whether or not instructions have been issued by the operator for doing setup with the current setup data. If the result is YES, processing transfers to step S169 and, if otherwise, to step S170.

At step S169, the display control means 134 writes image data specifying the contents of the setup items with the current setup data in the VRAM 134. The image data written in the VRAM 105 s displayed as an image on the display screen of the display 50 shown in FIG. 1. Processing then transfers to step s174 of the flowchart shown in FIG. 14.

At step S170, the display control means 134 writes image data specifying the contents of the setup items by the contents of the asset file in the VRAM 105. The image data written in the VRAM 105 is displayed as image on the display surface of the display 50 shown in FIG. 1. Processing then transfers to step S171 of the flowchart shown in FIG. 14. The as-set file means a file saved in the disc drive 350.

At step s171, the command issuing means 140 transmits setup data of the as-set file to the camera device 1000 and to the controllers 1200-1, . . . , 1200-n shown in FIG. 1. If the setup data have been sent to the camera device 1000 and to the controllers 1200-1, . . . , 1200-n shown in FIG. 1, the camera device 1000 and to the controllers 1200-1, . . . , 1200-n do setup operations by setting own parameters based on the transmitted setup data. Processing then transfers to step S172.

At step S172, the command analysis means 133 analyzes the command from the camera device 1000 and to the controllers 1200-1, . . . , 1200-n shown in FIG. 1 in order to judge whether or not transmission has regularly come to a close. If the result is YES, processing transfers to step S174 and, if otherwise, processing transfers to step to step S173.

At step S173, the command issuing means 173 re-transmits the setup data to the camera device 1000 and to the controllers 1200-1, . . . , 1200-n shown in FIG. 1. Processing then transfers to step S174.

At step S174, the instructions analysis means 132 analyzes at which portion of the image the instructions by the pointing device 300 or the keyboard 250 have been issued. Based on the results of analysis, the command analysis means 133 analyzes the command instructed by the operator in order to judge whether or not the command is a command specifying the file processing. If the result is YES, processing transfers to step S200.

At step S200, file processing is carried out before processing transfers to step S178.

At step S175, the instructions analysis means 132 analyzes at which portion of the image the instructions by the pointing device 300 or the keyboard 250 have been issued. Based on the results of analysis, the command analysis means 133 analyzes the command instructed by the operator in order to judge whether or not the command is a command specifying the setup processing. If the result is YES, processing transfers to step S201.

At step S201, setup processing is carried out before processing transfers to step S178.

At step S176, the instructions analysis means 132 analyzes at which portion of the image the instructions by the pointing device 300 or the keyboard 250 have been issued. Based on the results of analysis, the command analysis means 133 analyzes the command instructed by the operator in order to judge whether or not the command is a command specifying the edit processing. If the result is YES, processing transfers to step S202.

At step S202, edit processing is carried out before processing transfers to step S178.

At step S177, the instructions analysis means 132 analyzes at which portion of the image the instructions by the pointing device 300 or the keyboard 250 have been issued. Based on the results of analysis, the command analysis means 133 analyzes the command instructed by the operator in order to judge whether or not the command is a command specifying the help processing. If the result is YES, processing transfers to step S203.

At step S203, help processing is carried out before processing transfers to step S178.

At step S178, the instructions analysis means 132 analyzes at which portion of the image the instructions by the pointing device 300 or the keyboard 250 have been issued. Based on the results of analysis, the command analysis means 133 analyzes the command instructed by the operator in order to judge whether or not the command is a command specifying the end of the imaging system. If the result is YES, processing is terminated and if otherwise, processing reverts to step S174.

12. Explanation of the Operation of Setup Processing by the Imaging System (see FIGS. 15 to 21)

FIGS. 15 to 21 collectively show a flowchart for illustrating the setup processing shown in FIG. 14.

Figure 15:
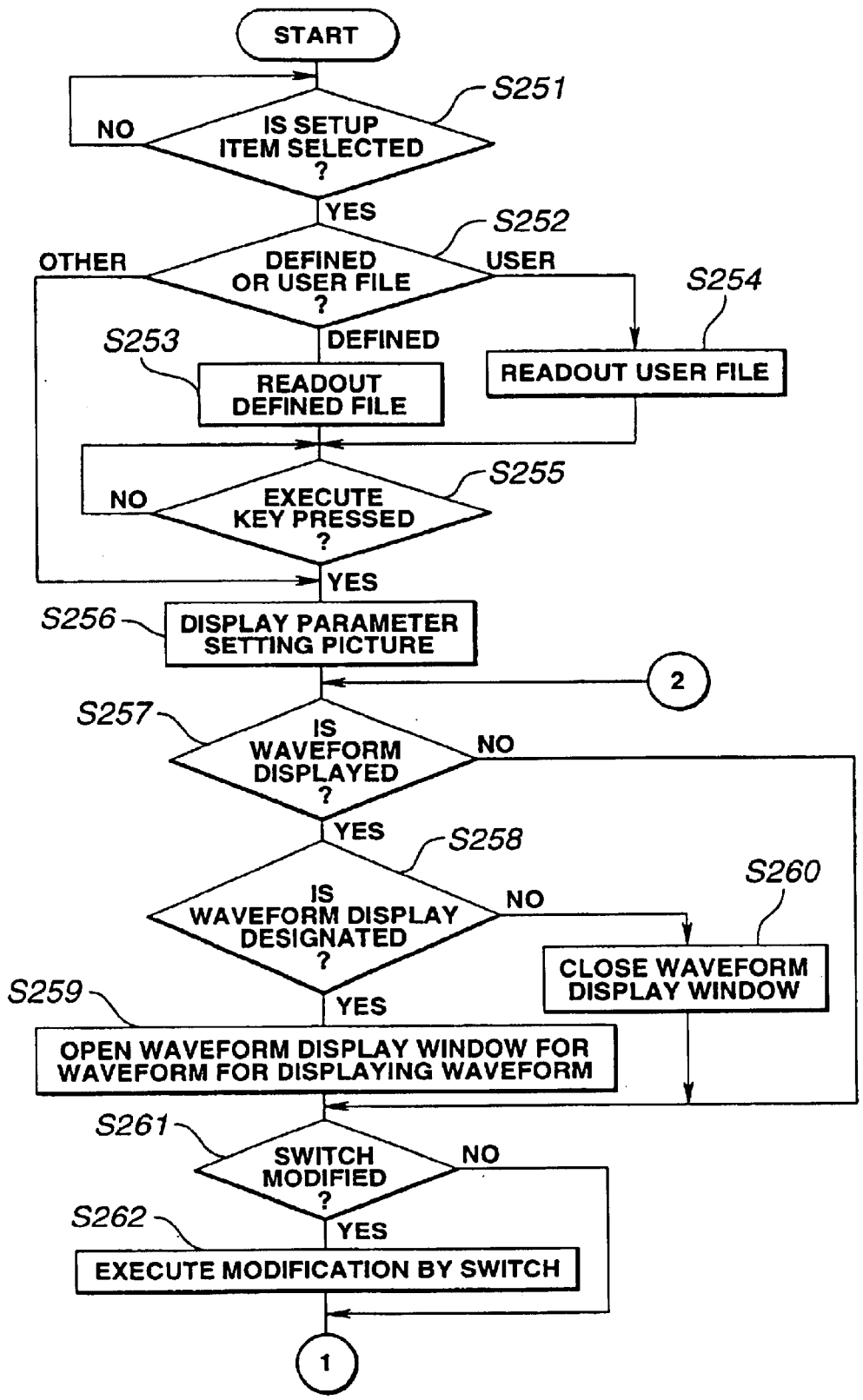
FIG. 15 is a flowchart for illustrating main processing of the imaging system.

At step S251 shown in FIG. 15, the CPU 101 analyzes, by instructions analysis means 132, at which position of the image the instructions by the pointing device 300 or the keyboard 250 has been issued. Based on the results of this analysis, the CPU 101 analyzes the command instructed by the operator in order to judge whether or not this command is a command specifying the designation of the setup item. If the result is YES, processing transfers to step S252 and, if otherwise, processing dwells at step S251.

At step S252, the CPU 101 judges by the file management means 140 whether the designated setup item is the definition file, user file or others as later explained. If the CPU 101 judges the setup item to be the definition file, processing transfers to step S253. If the CPU 101 judges the setup item to be a user file or others, processing transfers to step S254 or to step S256, respectively.

The definition file and the user file will be explained later in '17. Explanation of Various file Formats and a Data Format for Transmission Used in an Imaging System'. The definition file means the range of possible control of various functions, such as white balance, gamma correction or skin tone, while the user file is a file in which the above various functions have been optionally selected and set.

At step S253, the CPU 101 reads out the definition file from the disc drive 350 via file management means 140 and causes the definition file to be displayed on the display 50. Processing then transfers to step S255.

At step S254, the CPU 101 reads out the user file from the disc drive 350 via file management means 140 and causes the user file to be displayed on the display 50. Processing then transfers to step S255.

At step S255, the definition file or the user file has specified parameters deleted or has parameter values changed by, for example, the operator actuating the keyboard. The CPU 101 judges whether or not an execute key, not shown, has been pressed. If the key has been pressed, processing transfers to step S256 and, if otherwise, processing dwells at step S255.

At step S256, the CPU 101 reads out from the disc drive 350 by the file management means 140 the image data of the parameter setting window based on the parameter selected at step S252 or the definition file at the time point of pressing of the execute key at step S255. The CPU 101 writes the image data for parameter setting window via display control means 134 on the VRAM 105 in order to display the display image corresponding to the image data for parameter setting window on the display 50 before processing transfers to step S57.

Figure 17:
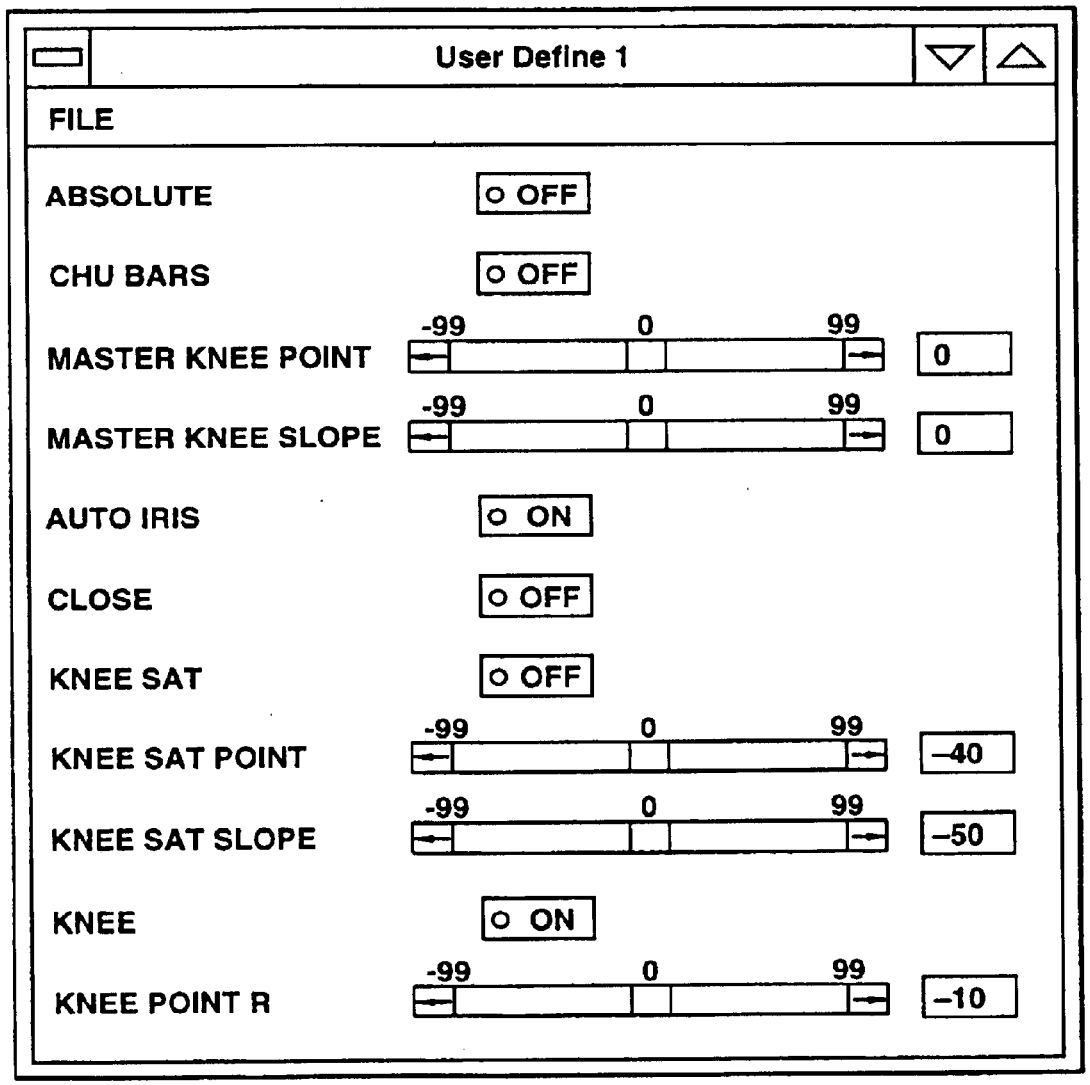
FIG. 17 illustrates a screen displayed on a user file.

Thus, if the image data of the parameter setting window derived from the user file shown in FIG. 16 is read out, the various functions, such as knee processing or auto-iris, are displayed on the display 50 as parameters previously selected and set by the user, as shown for example in FIG. 17. The CPU 101 is responsive to the operation setting on the pointing device 300 or the operation setting on the keyboard 250 to control a controller 580 of the camera device 100, as later explained, for adjusting the functions of, for example, knee processing, displayed on the display 50. This enables the computer 100 to arrange items functionally similar to one another in one window or to arrange items having high adjustment frequency in one window for improving non-linear signal processing or color hue adjustment of the camera device 1000.

Figure 19:
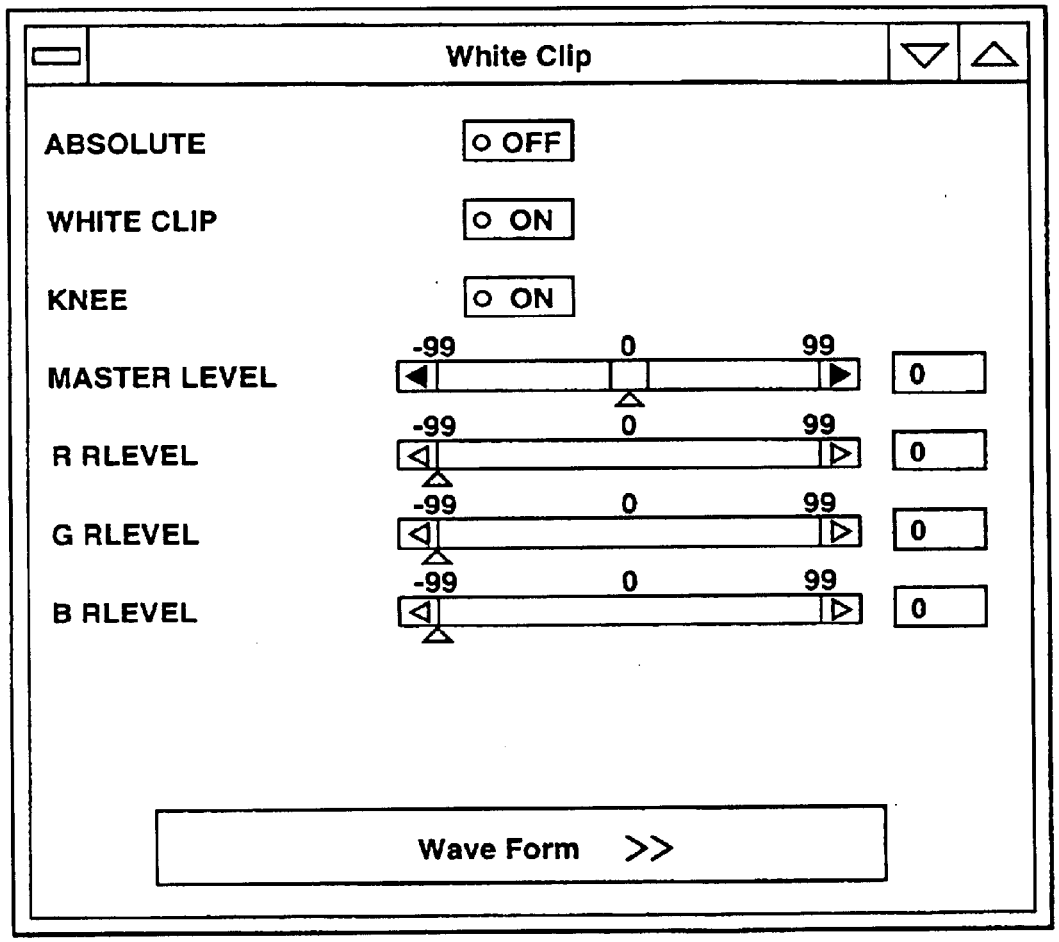
FIG. 19 illustrates the state of a screen when part of the functions owned by the camera device becomes unusable.

Also, if, based on the definition file from which part of items, such as R, G or B level adjustment for white clip, has been deleted, image data of a parameter setting window is read out, only items of R, G or B level adjustment for white clip are displayed in a net pattern, as shown in FIG. 19, while items of master level adjustment for white clip are directly displayed. At this time, the CPU 101 controls the black/white clip circuits 568, 569 and 670, as later explained, via controller 580 of the camera device 1000, so that the function of the netted items will not be adjusted. Thus, the netted items, specifically the levels of R, G and B of the white clip, becomes unable to be adjusted, thus evading mistaken operation of the user. In particular, if an item which, once set, need not be re-adjusted, such as standard data of a broadcasting station, is set and then deleted from the definition file, it becomes possible to save the labor of making second adjustment entailed by inadvertent user operation.

Figure 20:
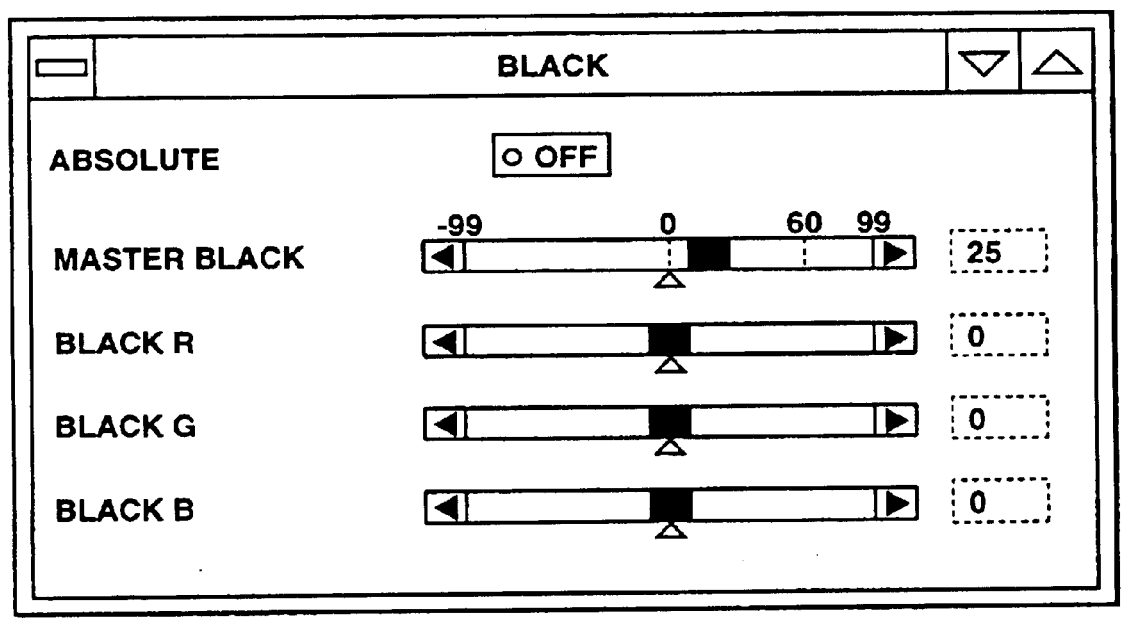
FIG. 20 illustrates the state in case limitations have been imposed on the range of change of the above various functions.

On the other hand, if image data of the parameter setting window is read out based on a definition file in which a limitation of certain items, such as master black, is changed to '0 to 60%', dotted lines specifying a limitation range is displayed at '10%' and '60%' of the master black, while no such dotted lines are displayed in other sites, namely black R, G or B, as shown for example in FIG. 20. At this time, the CPU 101 controls the controller 580 of the camera device 1000 for prohibiting the master black adjustment from exceeding the above range of limitation. Thus, the master black becomes unable to be adjusted beyond 0 to 60% thus evading mistaken user operation. In particular, if the variable range of specified functions cannot be set to 0% to 100%, depending on the types of the camera device 1000, the variable range can be manifested to the user by previously setting the variable range as described above. Moreover, the user can be protected from making mistaken adjustment of the camera device 1000.

At step S257, the CPU101 judges, via instructions analysis means, whether or not there is waveform display. If the result is YES, processing transfers to step S255 and, if otherwise, processing transfers to step to step S258.

At step S258, the CPU101 analyzes the pressed-down position of the button of the pointing device 300 via instructions analysis means 132. Based on the analyzed results, the CPU 101 judges whether or not waveform display is designated. If the result is YES, processing transfers to step S259 and, if otherwise, processing transfers to step to step S260.

At step S259, the CPU 101 writes window image data for waveform display via display control means 134 on the VRAM 105 to display a display image corresponding to the window image data for waveform display on the display 50. Processing then transfers to step S261.

At step S260, the CPU 101 writes window image data for waveform display via display control means 134 on the VRAM 105 to display a display image corresponding to the window image data for waveform display on the display 50. Processing then transfers to step S261. This erases the window image data for waveform display from the display 50.

At step S261, the CPU 101 analyzes, via instructions analysis means 132, the click position on the image of the button of the pointing device 300, for judging, based on the result of analysis, whether or not the switch image has been changed. If the result is YES, processing transfers to step S262 and, if otherwise, processing transfers to step to step S269 shown in FIG. 21.

Figure 21:
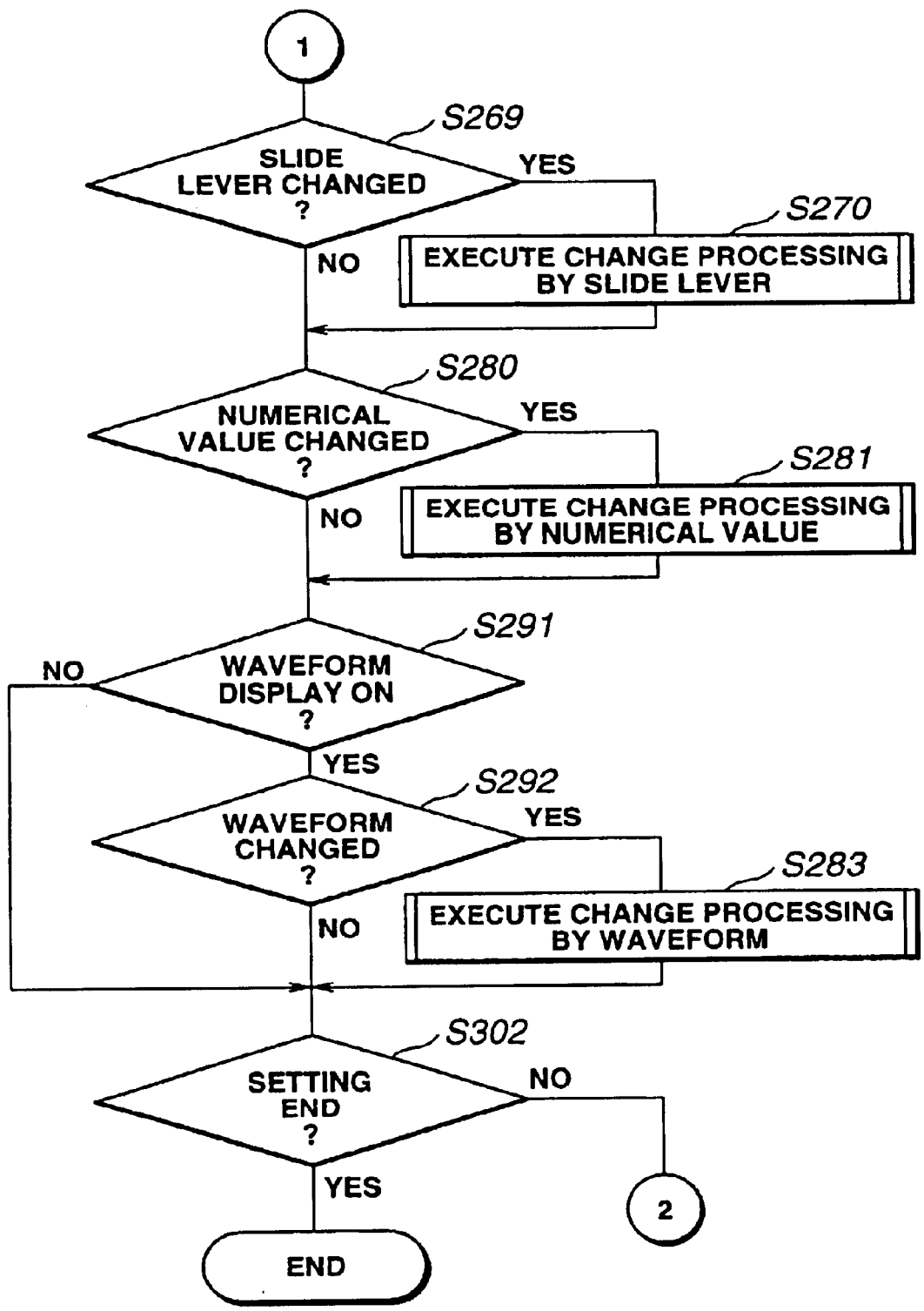
FIG. 21 is a flowchart for illustrating setup processing.

At step S262, the CPU 101 executes changes by the switch before proceeding to step S269 shown in FIG. 21.

At step S269, the CPU 101 analyzes, via instructions analysis means 132, the pressed position on the image of the pointing device 300, and judges, based on the results of analysis, whether the slide lever image has been changed. If the result is YES, processing transfers to step S270 and, if otherwise, processing transfers to step to step S280.

At step S270, the CPU 101 executes changes by the slide lever before proceeding to step S280.

At step S280, the CPU 101 analyzes, via instructions analysis means 132, the pressed position on the image of the pointing device 300, and judges, based on the results of analysis, whether the numerical value has been changed. If the result is YES, processing transfers to step S281 and, if otherwise, processing transfers to step to step S291.

At step S281, the CPU 101 executes changes by the numerical value before proceeding to step S291.

At step S291, the CPU 101 analyzes, via instructions analysis means 132, the click position on the image of the pointing device 300, and judges, based on the results of analysis, whether the waveform display is on. If the result is YES, processing transfers to step S292 and, if otherwise, processing transfers to step S302.

At step S292, the CPU 101 analyzes, via instructions analysis means 132, the pressed position on the image of the pointing device 300, and judges, based on the results of analysis, whether the waveform display has been changed. If the result is YES, processing transfers to step S293 and, if otherwise, processing transfers to step to step S302.

At step S293, the CPU 101 executes changes by the waveform before proceeding to step S302.

At step S302, the CPU 101 analyzes, via instructions analysis means 132, the click position on the image of the pointing device 300, for judging whether or not setting of the command instructed by the operator has come to a close. If the result is YES, processing is terminated and, if otherwise, processing transfers again to step to step S257 shown in FIG. 15.

13. Explanation of the Operation of Change Processing by a Switch of the Imaging System (see FIG. 22)

Figure 22:
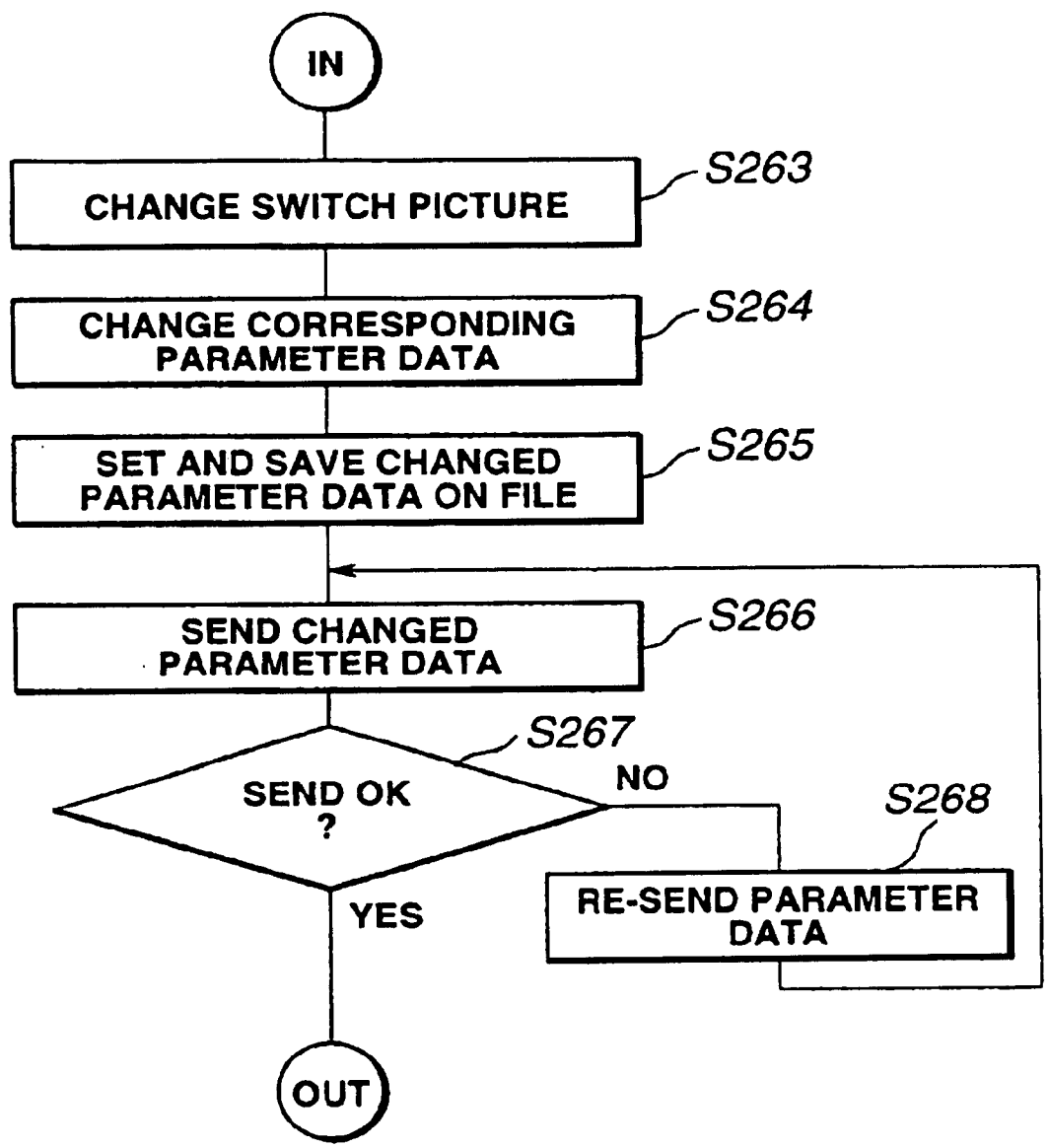
FIG. 22 is a flowchart for illustrating change processing by a switch.

FIG. 22 shows a flowchart for illustrating the operation for changing by switch of step S262 in the flowchart shown in FIG. 15.

At step S263 shown in FIG. 22, the CPU 101 writes, via display control means 134, the as-changed switch image data in the VRAM 105, and causes a display image corresponding to the switch image data to be displayed on the display 50. Processing then transfers to step S264.

At step S264, the CPU 101 changes the value of the parameter data via parameter control means 138 before proceeding to step S265.

At step S265, the CPU 101 sets, via file management means 140, the as-changed parameter data as file data in the RAM 104 to save the file data on the disc drive 350. Processing then transfers to step S266.

At step S266, the CPU 101 sends parameter data via command issuing means 139 to the camera device 1000 or to the controllers 1200-1, . . . , 1200-n, before proceeding to step S267.

At step S267, the CPU 101 analyzes, via command analysis means 133, the command from the camera device 1000 or the controllers 1200-1, . . . , 1200-n, for judging whether or not transmission has regularly come to a close. If the result is YES, processing passes through this processing routine and, if otherwise, processing transfers to step to step S268.

At step S268, the CPU 101 re-transmits parameter data to the camera device 1000 or to the controllers 1200-1, . . . , 1200-n, via command issuing means 139, before reverting to step S266.

14. Explanation of the Operation of Change Processing by a Slide Lever of the Imaging System (see FIG. 23)

Figure 23:
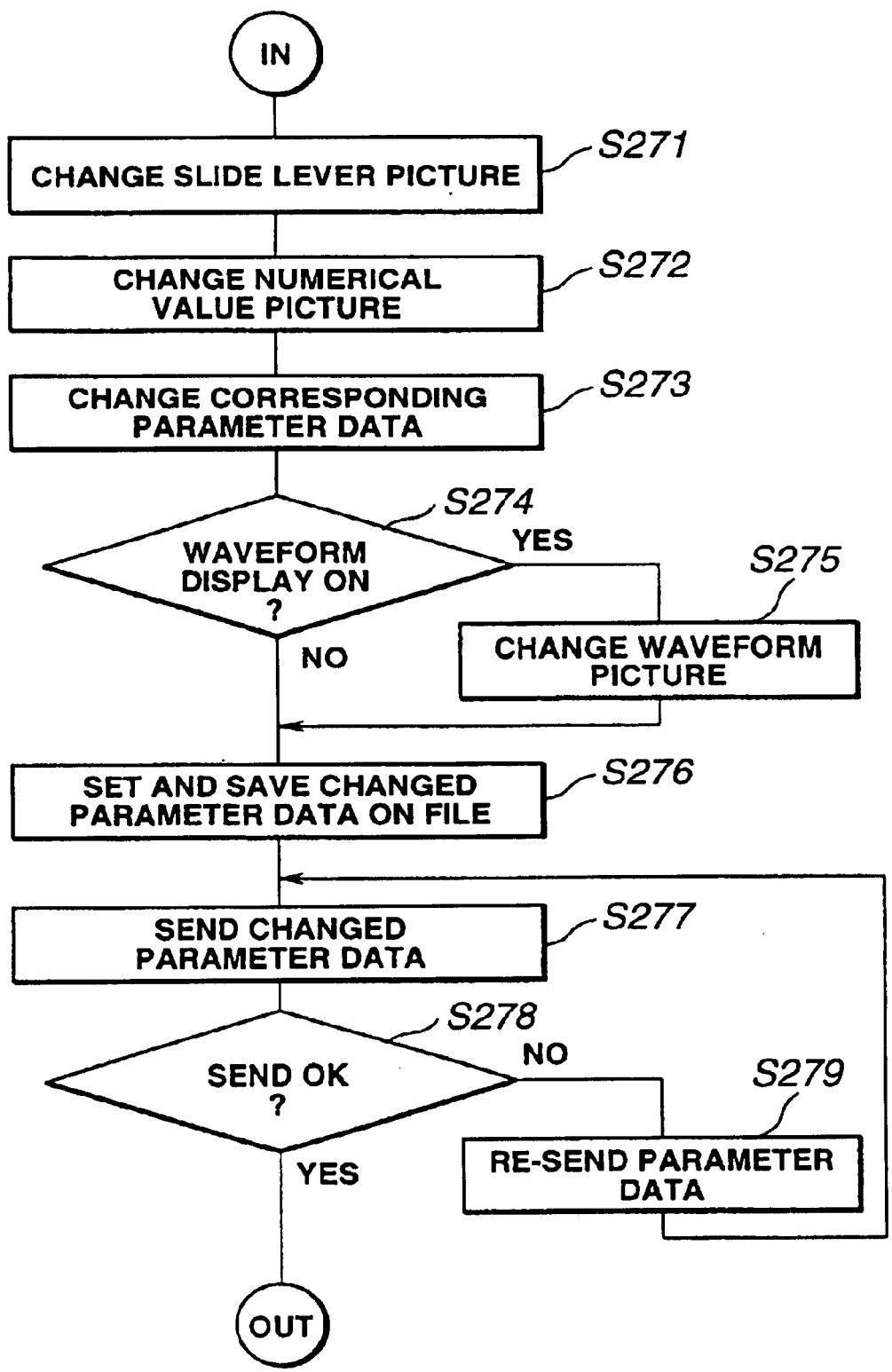
FIG. 23 is a flowchart for illustrating change processing by a slide lever.

FIG. 23 shows a flowchart for illustrating change processing by a slide lever shown in FIG. 21.

At step S271 shown in FIG. 23, the CPU 101 detects, via instructions analysis means 132, the amount of displacement of the pointing device 300 since thrusting of the button of the pointing device 300 until releasing of the button. Responsive to the amount of displacement, the CPU 101 changes the lever image data of the slide lever image stored in the VRAM 105. Processing then transfers to step S272.

Figure 24:
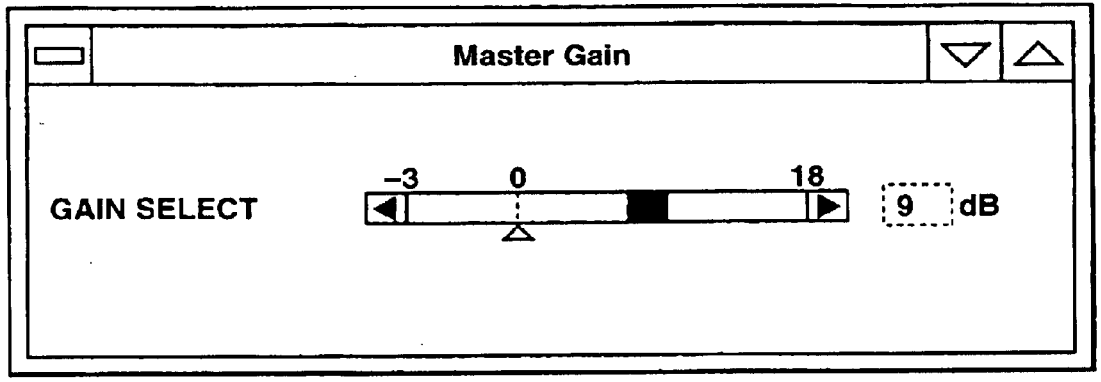
FIG. 24 shows a state of stepwise change on clicking a scrolling arrow.

If the slide lever takes stepped values, such as −3, 0, 3, 6, 9, 12, 15 and 18, as shown in FIG. 24, it is changed by one step for each clicking of the scroll arrow or by ten steps for each clicking of the scroll lever. Also, the scroll box can be dragged or a numerical value can be entered directly into a text box on the right adjacent part of the scroll bar for setting optional data.

Figure 25:
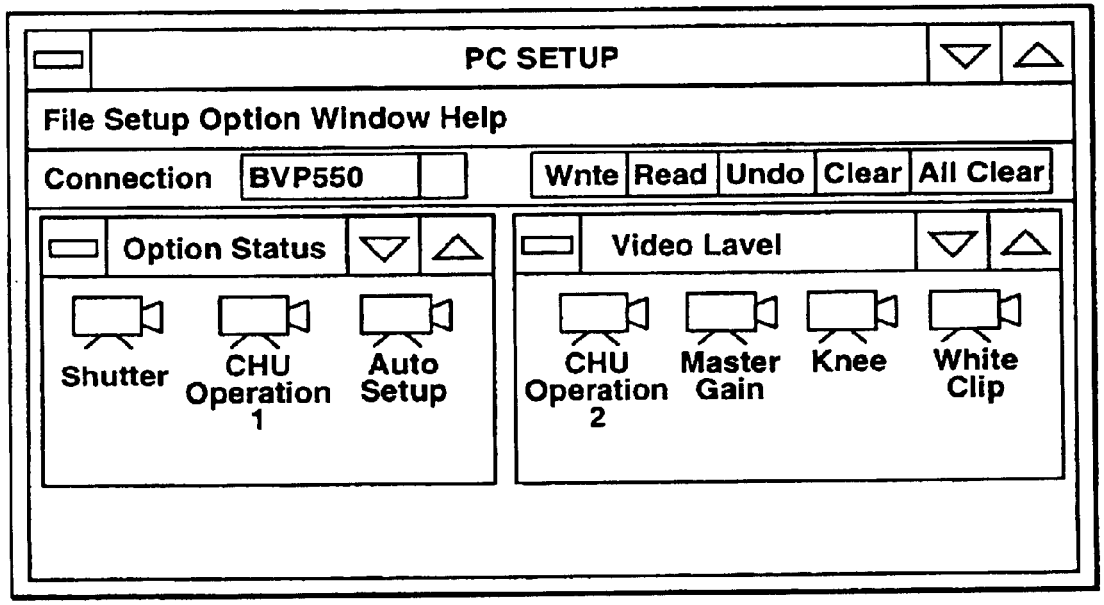
FIG. 25 shows an arrangement of a clear button and an all-clear button.
Figure 26:
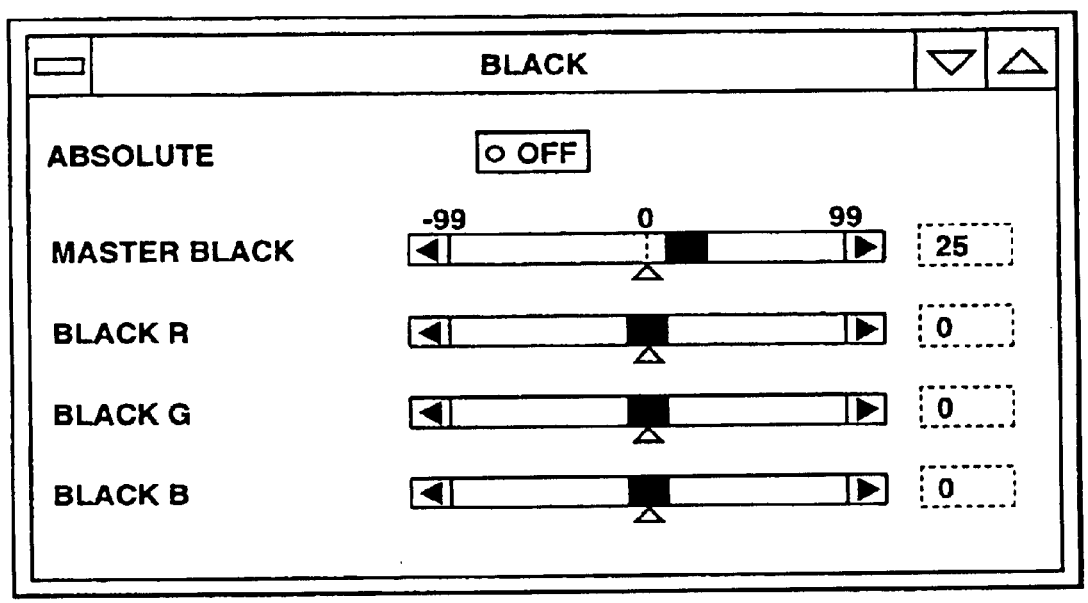
FIG. 26 illustrates an example of a display screen when resetting black balance data to an initial value.

In the case of the screen shown in FIG. 25, a clear button or an all-clear button arranged on the right side in the inside of a tool bar can be clicked by the user in order for the CPU 101 to restore the initial setting value displayed in the inside of the scroll bar or a broken-line value showing the value prevailing at the time of connection.

On the other hand, if, when the initial setting value is displayed previously in the scroll bar or a marker (vertical broken line) specifying the position of black balance data read at the time of connection with the camera device 1000 is being displayed on the display 50, a marker shown by Δ directly below the scroll bar is clicked, the CPU 101 can control the controller 580 of the camera device 1000 for resetting to the initial value instantaneously.

At step S272, the CPU 101 changes the numerical value data image stored in the VRAM 105 based on the above amount of displacement via display control means 134 before proceeding to step S273.

At step S273, the CPU 101 changes the value of the parameter data based on the amount of displacement via parameter control means 138 before proceeding to step S274.

At step S274, the CPU 101 judges, via display control means 134, whether or not the waveform display is on. If the result is YES, processing transfers to step S275 and, if otherwise, processing transfers to step to step S276.

At step S275, the CPU 101 changes, via parameter control means 138, the waveform figure image stored in the VRAM 105, based on the amount of displacement, before proceeding to step S276.

At step S276, the CPU 101 sets, via file management means 140, the as-changed parameter data as file data in the RAM 104, for saving the file data in the disc drive 350. Processing then transfers to step S277.

At step S277, the CPU 101 transmits parameter data and so forth via command issuing means to the camera device 1000 or to the controllers 1200-1, . . . , 1200-n, before proceeding to step S278.

At step S278, the CPU 101 analyzes, via command analysis means 133, the command from the camera device 1000 or the controllers 1200-1, . . . , 1200-n or the command from the data converter 400 for judging whether or not the transmission regularly has come to a close. If the result is YES, processing passes through this processing routine and, if otherwise, processing transfers to step to step S279.

Therefore, if the transmission regularly has come to a close, and the all-clear button shown in FIG. 25 has been clicked by the pointing device 300, the CPU 101 controls the controller 580 of the camera device 1000 for reading out the initial setting value displayed in the inside of the scroll bar or the value prevailing at the time of connection from, for example, the disc drive 350 for resetting all of parameter values in the application to initial values. If the clear button is clicked, the CPU 101 similarly controls the controller 580 of the camera device 1000 for resetting only active (that is colored) parameters in the inside of the scroll window to initial values.

In this manner, the user may be relieved of load during setup as compared to the case of adjustment only by the scroll bar. The above becomes effective especially when it is desired to restore default data during adjustment.

At step S279, the CPU 101 re-transmits parameter data via command issuing means 139 to the camera device 1000 or the controllers 1200-1, . . . , 1200-n before proceeding to step S277.

15. Explanation of the Operation of Change Processing by a Number of the Imaging System (see FIG. 27)

Figure 27:
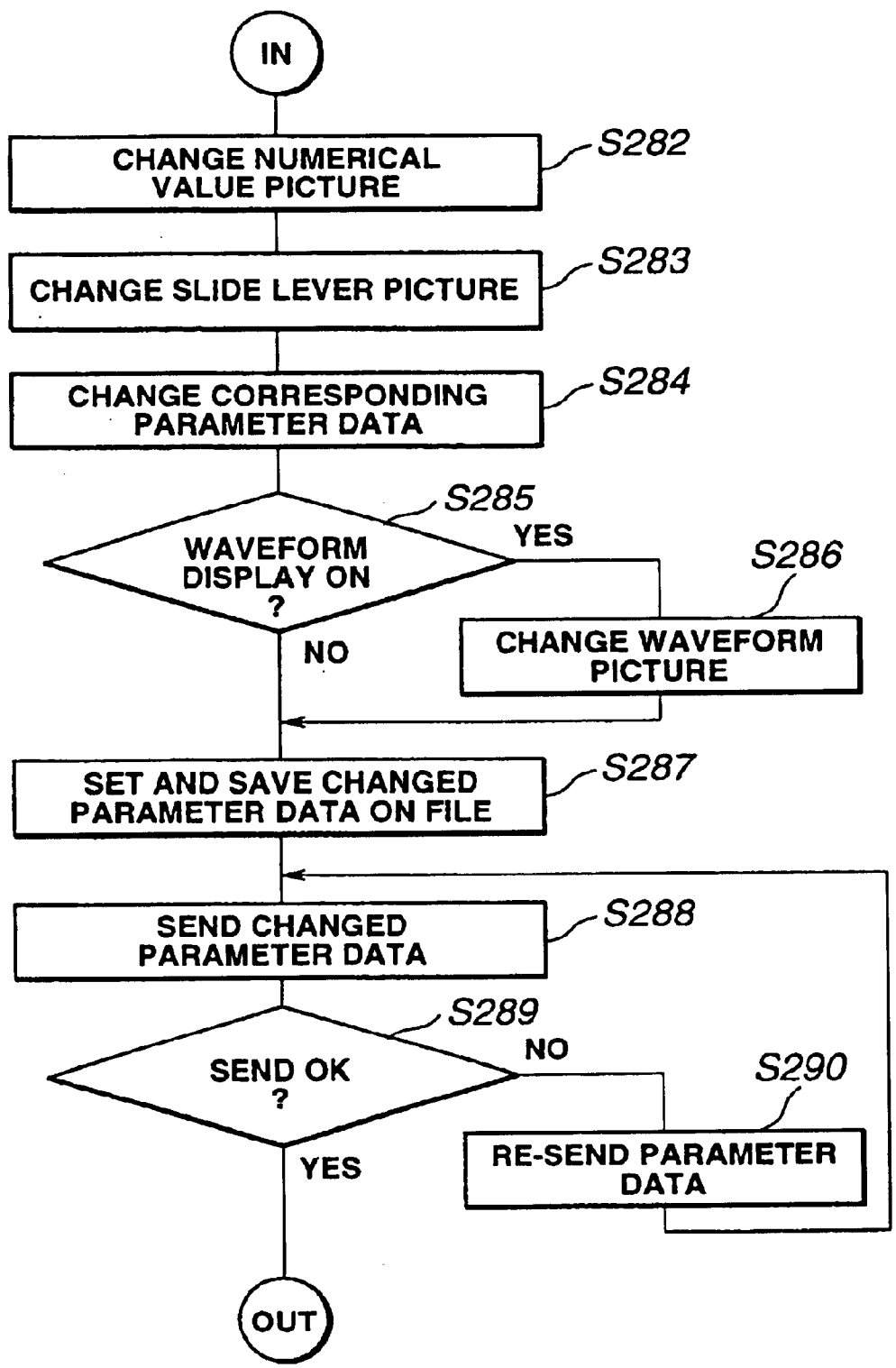
FIG. 27 is a flowchart for illustrating change processing by a numerical value.

FIG. 27 shows a flowchart for illustrating the change operation by the numerical value shown in FIG. 21.

At step S282 in FIG. 27, the CPU 101 detects, via instructions analysis means 132, the numerical value entered from the keyboard 250. Based on the above numerical value, the CPU 101 changes, via display control means 134, the numerical value data image stored in the VRAM 105, before proceeding to step S283.

At step S283, the CPU 101 changes the slide lever image stored in the VRAM 105, via display control means 134, on the basis of the above numerical data, before proceeding to step S284.

At step S284, the CPU 101 changes the parameter data value, via parameter control means 134, on the basis of the above numerical data, before proceeding to step S285.

At step S285, the CPU 101 judges, via display control means 134, whether or not waveform display is on. If the result is YES, processing transfers to step S286 and, if otherwise, processing transfers to step to step S287.

At step S286, the CPU 101 changes the waveform figure image stored in the VRAM 105, via parameter control means 134, on the basis of the above numerical data, before proceeding to step S287.

At step S287, the CPU 101 sets the as-changed parameter data via file management means 140 as file data in the RAM 104 to save the file data in the disc drive 350. Processing then transfers to step S288.

At step S288, the CPU 101 transmits parameter data and so forth via command issuing means 139 to the camera device 1000 or to the controllers 1200-1, . . . , 1200-n, before proceeding to step S289.

At step S289, the CPU 101 analyzes, via command analysis means 133, the command from the camera device 1000 or the controllers 1200-1, . . . , 1200-n or the command from the data converter 400 for judging whether or not the transmission regularly has come to a close. If the result is YES, processing passes through this processing routine and, if otherwise, processing transfers to step to step S290.

At step S290, the CPU 101 re-transmits parameter data via command issuing means 139 to the camera device 1000 or the controllers 1200-1, . . . , 1200-n before proceeding to step S288.

16. Explanation of the Operation of Change Processing by the Waveform of the Imaging System (see FIG. 28)

Figure 28:
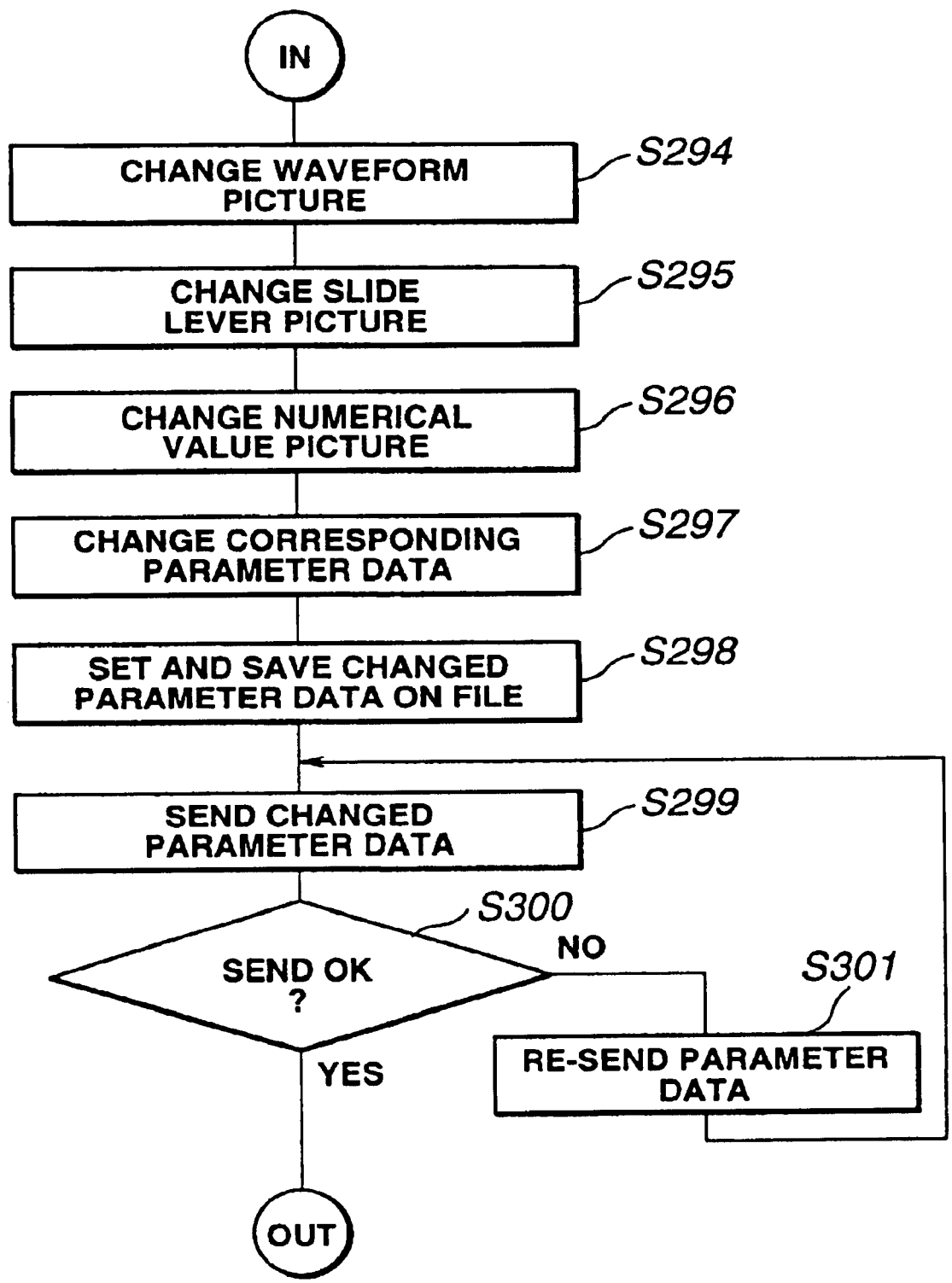
FIG. 28 is a flowchart for illustrating change processing by a waveform.

FIG. 28 shows a flowchart for illustrating the change processing by waveform shown in FIG. 21.

At step S294, the CPU 101 detects, via instructions analysis means 132, the amount of displacement of the pointing device 300 since thrusting of the button of the pointing device 300 until releasing of the button. The CPU 101 changes the waveform figure image data stored in the VRAM 105 based on the amount of displacement via display control means 134 before proceeding to step S295.

At step S295, the CPU 101 changes, via display control means 134, the slide image data stored in the VRAM 105 based on the amount of displacement, before proceeding to step S296.

At step S296, the CPU 101 changes, via display control means 134, the numerical value data image data stored in the VRAM 105 based on the amount of displacement, before proceeding to step S297.

At step S297, the CPU 101 changes, via parameter control means 138, the values of the parameter data based on the amount of displacement, before proceeding to step S298.

At step S298, the CPU 101 sets, via file management means 140, the as-changed parameter data as file data in the RAM 104 for saving the file data in the disc drive 350. Processing then transfers to step S299.

At step S299, the CPU 101 sends, via command issuing means 139, the parameter data and so forth to the camera device 1000 or the controllers 1200-1, . . . , 1200-n before proceeding to step S300.

At step S300, the CPU 101 analyzes, via command analysis means 133, the command from the camera device 1000 or the controllers 1200-1, . . . , 1200-n or the command from the data converter 400 for judging whether or not the transmission regularly has come to a close. If the result is YES, processing passes through this processing routine and, if otherwise, processing transfers to step to step S301.

At step S301, the CPU 101 re-transmits parameter data via command issuing means 139 to the camera device 1000 or the controllers 1200-1, . . . , 1200-n before proceeding to step S299.

17. Explanation of Various File Formats and a Data Format for Transmission Used in an Imaging System (see FIG. 29)

FIGS. 29A to 29E illustrate examples of a transmission data format and a variety of file formats used in the imaging system.

FIG. 29A illustrates an example of a transmission format at the parameter setting time. Referring to FIG. 29A, this setup parameter file is made up of machine type ID data specifying the destination of transmission, commands specifying the parameter change, parameter ID data specifying parameter to be changed, and parameter data, for transmission.

FIG. 29B illustrates an example of a setup parameter file. As shown therein, the setup parameter file is made up of the machine type ID data, parameter ID data and parameter data. This setup parameter file is made up of all parameters set for the camera and the CCU.

FIG. 29C illustrates an example of an LSI port data file. As shown therein, the LSI port data file is made up of machine type ID data, LSI data, the number of bytes used data and setting data. The setting data is made up of the LSI port data required for the camera and the CCU and I/O port data.

FIG. 29D illustrates an example of a screen display setting file. As shown therein, the screen display setting file is made up of machine type ID data, parameter ID data and parameter display data. The parameter display data is data which number switch and which value should be used when selecting the switch number for establishing the desired setting.

FIG. 29E illustrates an example of an in-device data file. As shown therein, the in-device data file is made up of machine type ID data and in-device data. The in-device data includes gamma curve, data, scene, file, master setup file, various log files and service information. That is, this file is used for enabling saving and loading in the computer 100 the in-device information other than data handled by the setup parameter file owned by the camera and the CCU.

In addition to the above files, machine type setting files are also used. The machine type setting file is prepared from one machine type to another. The machine type setting file is loaded from the disc drive 350 to the computer 100, depending on the connection machine type, for setting the computer 100 for executing processing conforming to the connected machine type.

Specifically, with the above-mentioned definition file, as the machine type setting file, the possible adjustment range of various functions provided in the camera device 1000 is stated in the form of a text file. Specifically, the items of various functions, such as address, knee or white balance, and the range of possible adjustment, such as 0 to 100%, is stated from left.

The user file includes optionally selected one of the above functions. As in the definition file, the items of functions, such as address, knee or white balance, and the range of possible adjustment, such as 0 to 100%, are stated from left.

The above-described five files can be saved in, for example, an ASCII text form in the IC card set on the disc drive 350 or the card slot 109 shown in FIG. 1. Moreover, if the item 'FILE EDIT' of the pulldown menu 'SETUP' shown in FIG. 7 is selected, the contents can be changed in the text form.

18. Explanation of the Structure of a Data Converter Shown in FIG. 1 (see FIG. 30)

Figure 30:
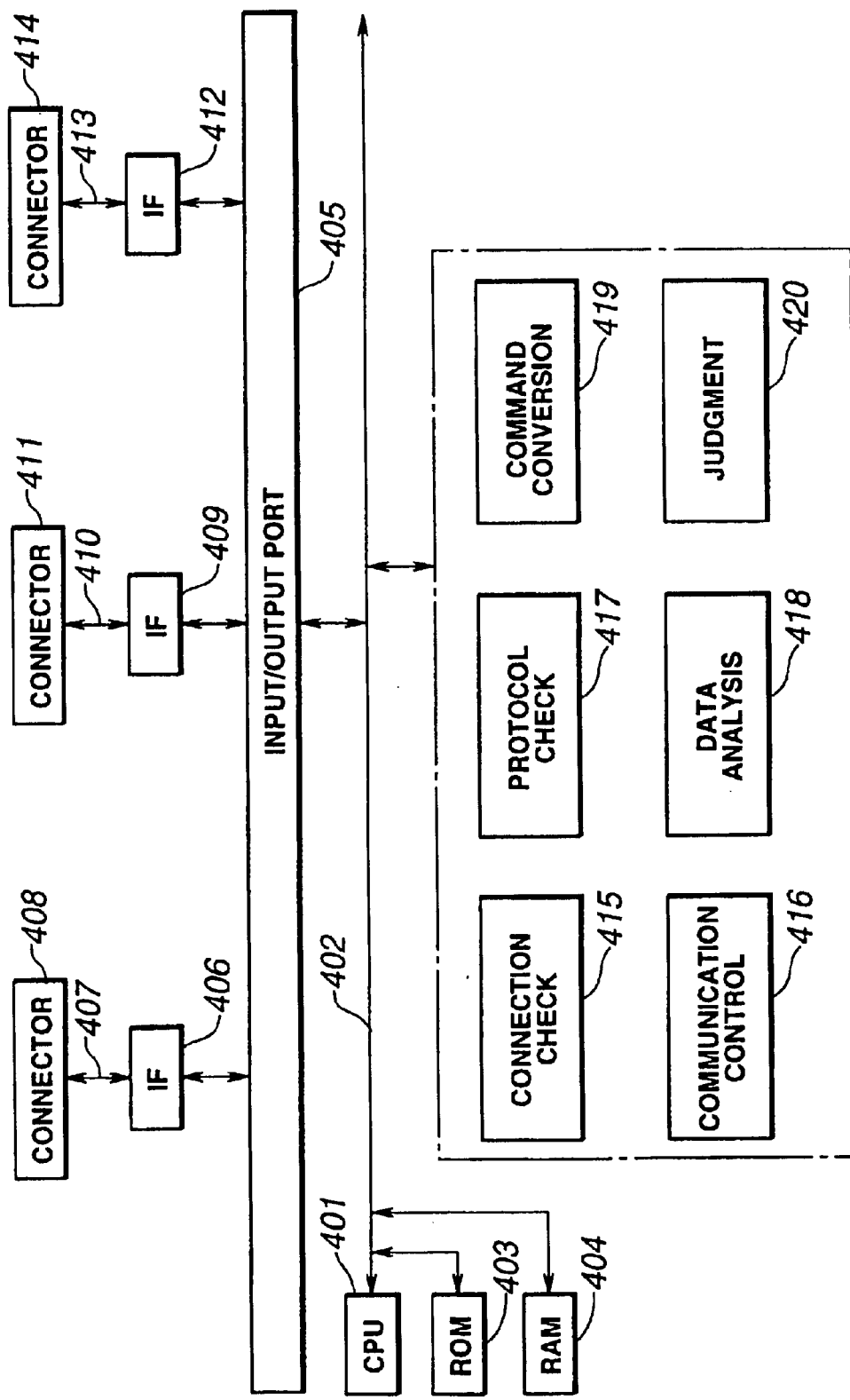
FIG. 30 illustrates an example of an inner structure of a data converter.

FIG. 30 shows an illustrative internal structure of the data converter 400 shown in FIG. 1.

[Connection and Structure]

In the data converter 400, a bus 402 made up of an address bus, a data bus and a control bus is connected to a CPU 401. To this bus 402 are connected a ROM 402, having stored therein protocol data or a protocol-conversion table, a working RAM 403 foe holding load data from the computer 100 and interfaces 406, 409 and 412. To these interfaces 406, 409 and 412 are connected connectors 408, 411 and 414, respectively.

The interfacing circuit 406, such as RS-232C or RS-422, is used for having communication with the computer 100. Two sorts of interfaces, such as RS-32C or RS-422, are used for each of the interfacing circuits 409 and 412 for coping with the types of the camera device 1000 or the controllers 1200-1, . . . , 1200-n.

If power source is connected to the data converter 300 shown in FIG. 30 and command conversion data is loaded from the computer 100, the CPU 401 can perform a number of functions, such as those shown in a chain-dotted line frame in FIG. 30.

A connection check means 415 has the function of checking the connection states between the data converter 400 and other devices. A communication control means 416 has the function of controlling the communication between the data converter 400 and other equipments connected to the data converter 400. A protocol check means 417 has the function of checking the communication protocol in case data is transmitted from other devices connected to the data converter 400. A data analysis means 418 has the function of judging whether or not data transmitted from the computer 100 is data for converting command data.

A command conversion means 419 has the function of converting the command data transmitted from the computer 100 into command data recognizable by the camera device 1000 or the controllers 1200-1, . . . , 1200-n and the function of converting the command data supplied from the camera device 1000 or the controllers 1200-1, . . . , 1200-n into command data recognizable by the computer 100. A decision means 420 has the function of giving various decisions.

The operation is now explained with reference to a flowchart shown in FIGS. 31 to 33.

19. Explanation of Control Operation of a Data Converter Shown in FIG. 30 (see FIGS. 31 to 33)

Figure 31:
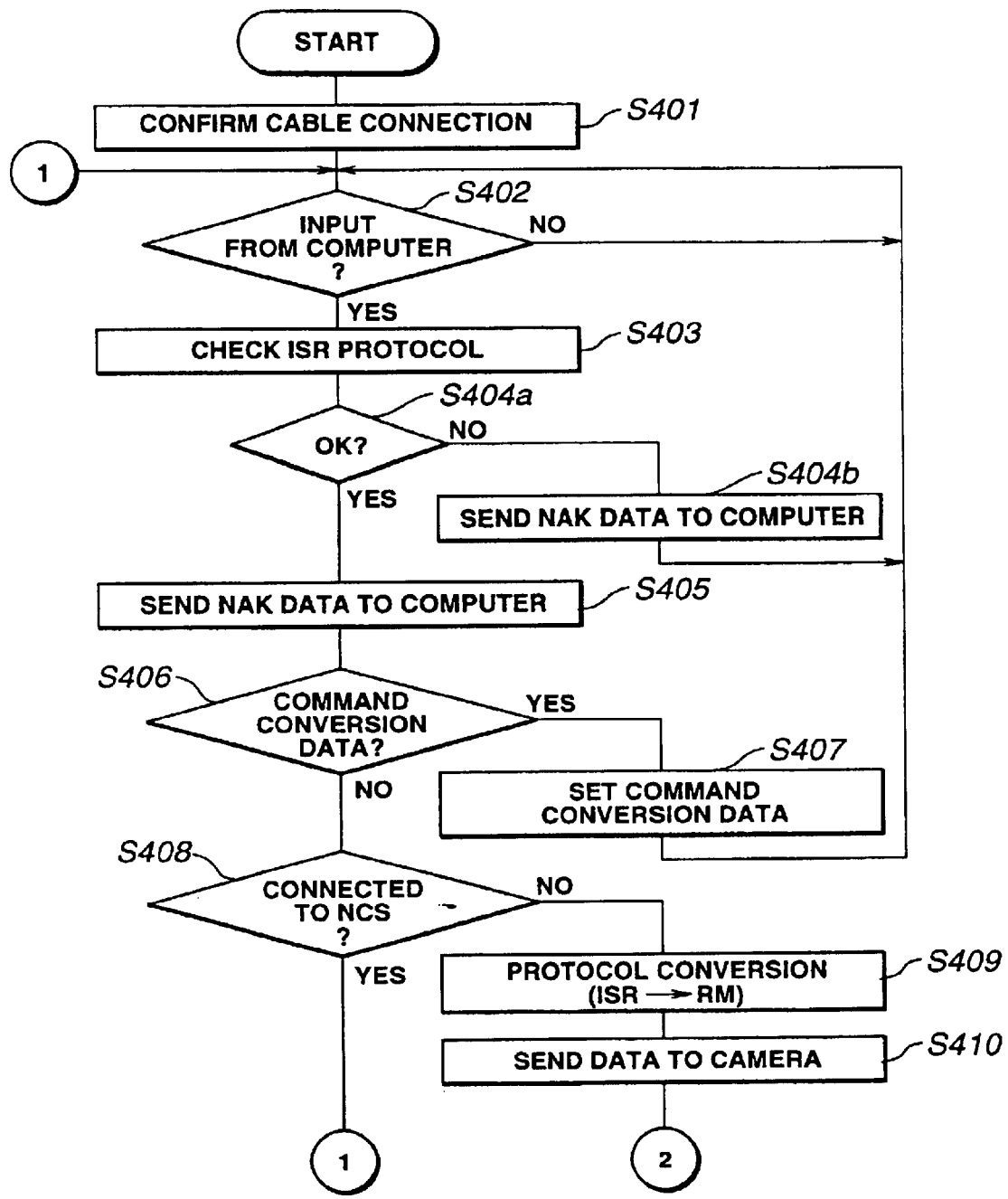
FIGS. 31 to 33 collectively show a flowchart for illustrating the control operation of the data converter.
Figure 32:
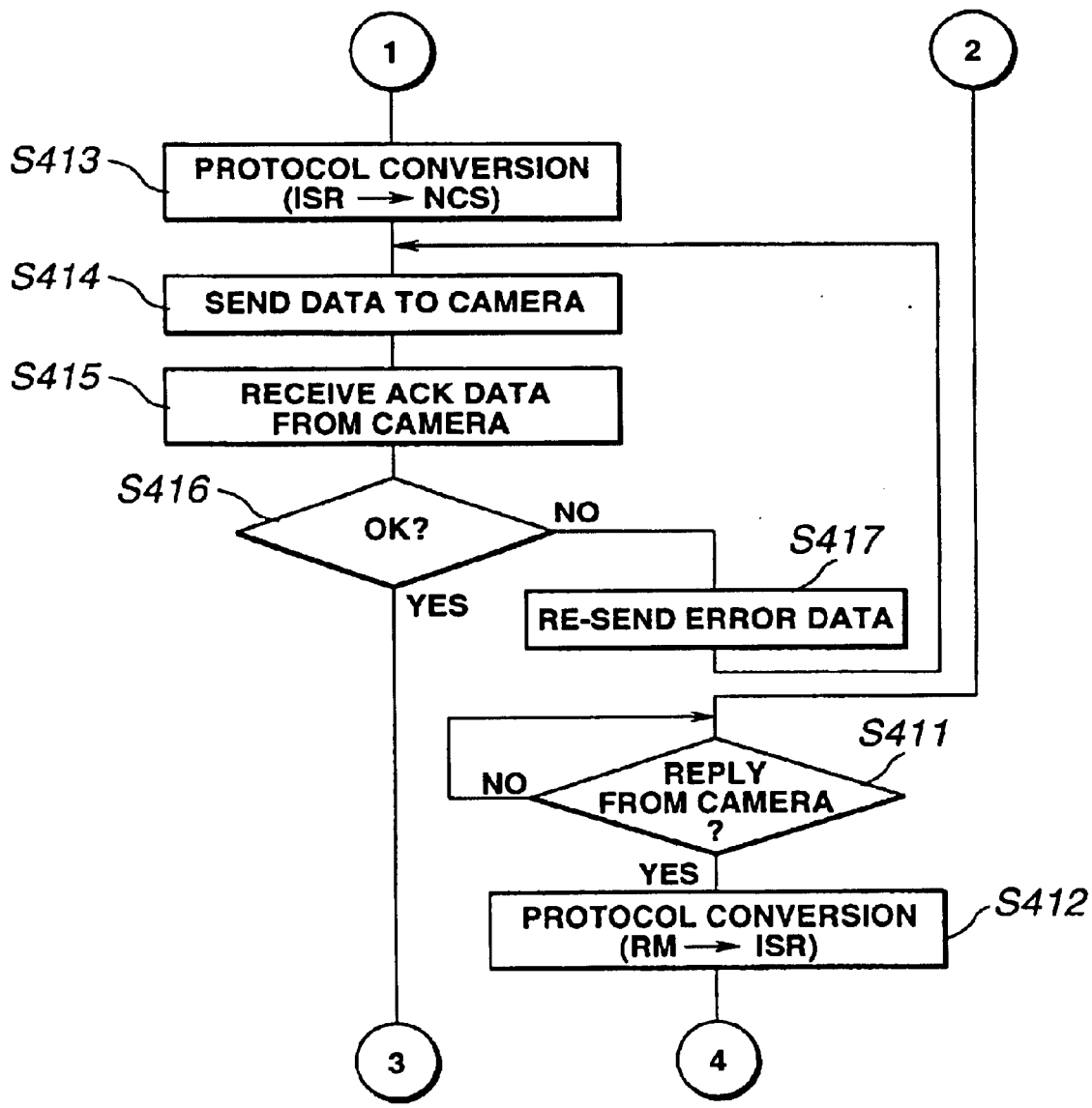
Figure 33:
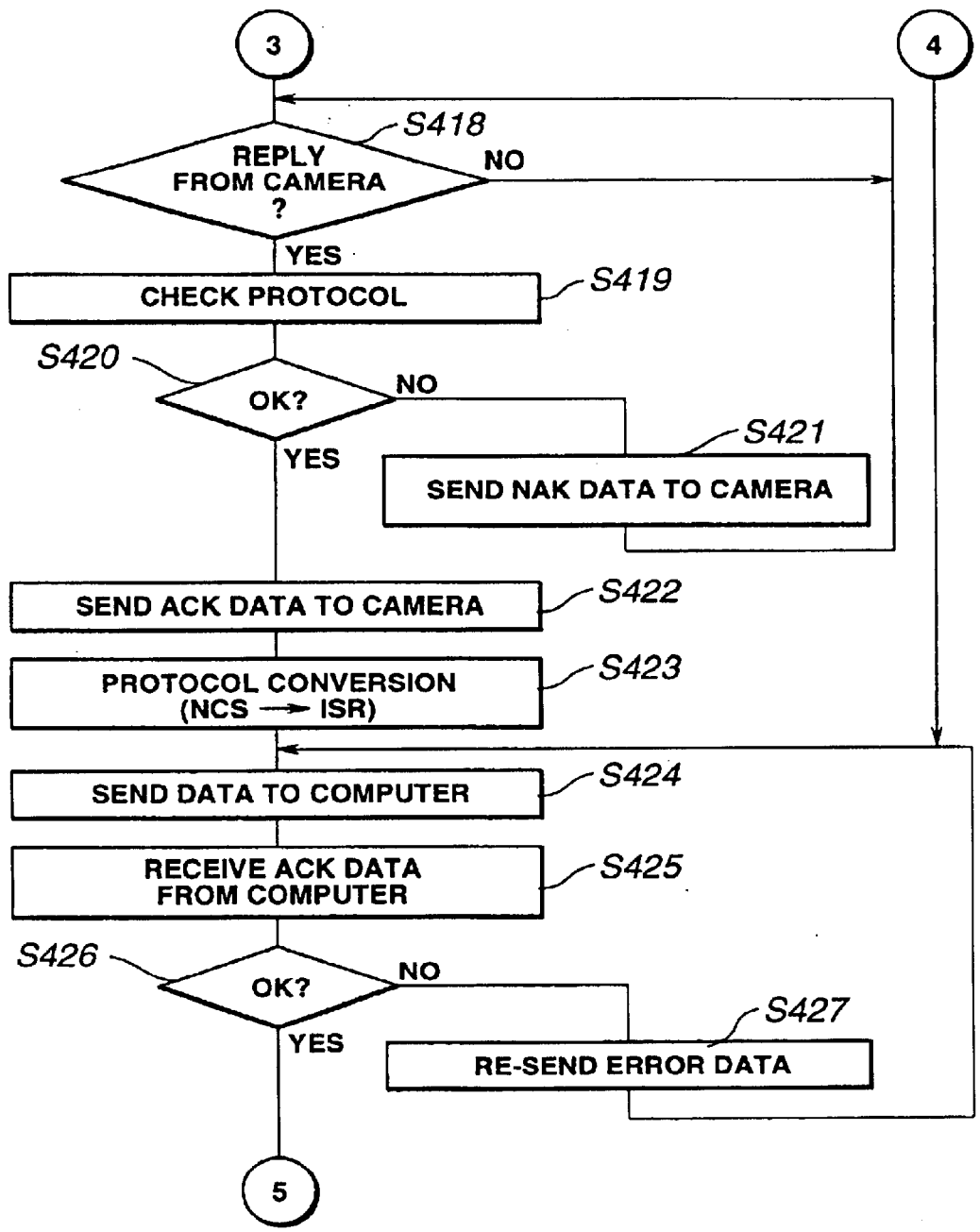

FIGS. 31 to 33 show a flowchart for illustrating the control operation of the data converter 400 shown in FIG. 30. In explaining the operation, it is assumed that the communication protocol used in the communication between the computer 100 and the data converter 400 is an ISR protocol prescribed in SMPTERP-273M, while the communication protocol used in the communication between the data converter 400 and the camera device 1000 or the controllers 1200-1, ..., 1200-n via the interfacing circuit 409 is an RM protocol and the communication protocol used in the communication between the data converter 400 and the camera device 1000 or the controllers 1200-1, ..., 1200-n via the interfacing circuit 412 is an NCS (New Command System) protocol. The ISR protocol is a protocol used in the interactive status reporting system (ISR system) which is a concentrated management system for broadcasting equipments. The parameter data communication is explained taking an example of communication between the computer 100 and the data converter 400 and between the data converter 400 and the camera device 1000.

It is noted that the above protocols are give merely for convenience in explanation and hence there is no limitations on the protocols or interfaces.

At step S401, the check means 415 confirms cable connection. Processing then transfers to step S402.

At step S402, the decision means 420 judges whether or not there is any input from the commuter 100. If the result is YES, processing transfers to step S402.

At step S403, the protocol check means 417 checks the ISR protocol. Processing then transfers to step S404a.

At step S404a, the decision means 420 makes a check to decide whether or not the ISR protocol has been recognized correctly. If the result is YES, processing transfers to step S405 and, if otherwise, processing transfers to step to step S404b.

At step S404b, the communication control means 416 sends NAK data to the computer 100. Processing then transfers again to step S402.

At step S405, the communication control means 416 sends ACK data to the computer 100. Processing then transfers again to step S406.

At step S406, the decision means 420 judges whether or not data transmitted from the computer 100 is command conversion data. If the result is YES, processing transfers to step S407 and, if otherwise, processing transfers to step to step S408.

At step S407, the command conversion means 49 sets command conversion data before proceeding again to step S402.

At step S408, the decision means 419 judges whether or not the camera device is the camera device 1000 employing the NCS protocol. If the result is YES, processing transfers to step S413 and, if otherwise, processing transfers to step to step S409.

At step S409, the command conversion means 419 converts the communication protocol from the ISR protocol to the RM protocol. Processing then transfers to step S410.

At step S410, the communication control means 416 transmits data to the camera device 1000. Processing then transfers to step S411 of the flowchart shown in FIG. 32.

At step S411, the decision means 420 judges whether or not any response has been made from the camera device 1000. If the result is YES, processing transfers to step S412.

At step S412, the command conversion means 419 converts the communication protocol from the RM protocol to the ISR protocol. Processing then transfers to step S424 of the flowchart shown in FIG. 28.

At step S413, the command conversion means 419 converts the communication protocol from the ISR protocol to the NCS protocol. Processing then transfers to step S414.

At step S414, the communication control means 416 sends data to the camera device 1000. Processing then transfers to step S415 of the flowchart shown in FIG. 32.

At step S415, the communication control means 416 receives the ACK data from the camera device 1000 before proceeding to step S416.

At step S416, the decision means 420 judges whether or not data transmission has been carried out correctly. If the result is YES, processing transfers to step S418 of the flowchart shown in FIG. 33 and, if otherwise, processing transfers to step to step S417.

At step S417, the communication control means 416 re-sends error data before processing reverts to step S414.

At step S418, the decision means 420 judges whether or not any response has been made from the camera device 1000. If the result is YES, processing transfers to step S419.

At step S419, the protocol check means 417 checks the protocol. Processing then transfers to step S420.

At step S420, the decision means 420 judges whether or not NCS protocol has been recognized correctly. If the result is YES, processing transfers to step S422 and, if otherwise, processing transfers to step to step S421.

At step S421, the communication control means 416 transmits NAK data to the camera device 1000. Processing then reverts to step S418.

At step S422, the communication control means 416 transmits ACK data to the camera device 1000. Processing then reverts to step S423.

At step S423, the command conversion means 419 converts the communication protocol from the NCS protocol to the ISR protocol. Processing then transfers to step S424.

At step S424, the communication control means 416 transmits data to the computer 100 before processing transfers to step S426.

At step S425, the communication control means 416 receives ACK data from the computer 100. Processing then transfers to step S426.

At step S426, the decision means 420 judges whether or not data transmission has been carried out correctly. If the result is YES, processing reverts to step S402 of the flowchart shown in FIG. 31 and, if otherwise, processing transfers to step to step S427.

At step S427, the communication control means 416 re-sends error data before processing reverts to step S424.

20. Explanation of the Structure of a Video System of a Camera Shown in FIG. 1 (see FIG. 34)

Figure 34:
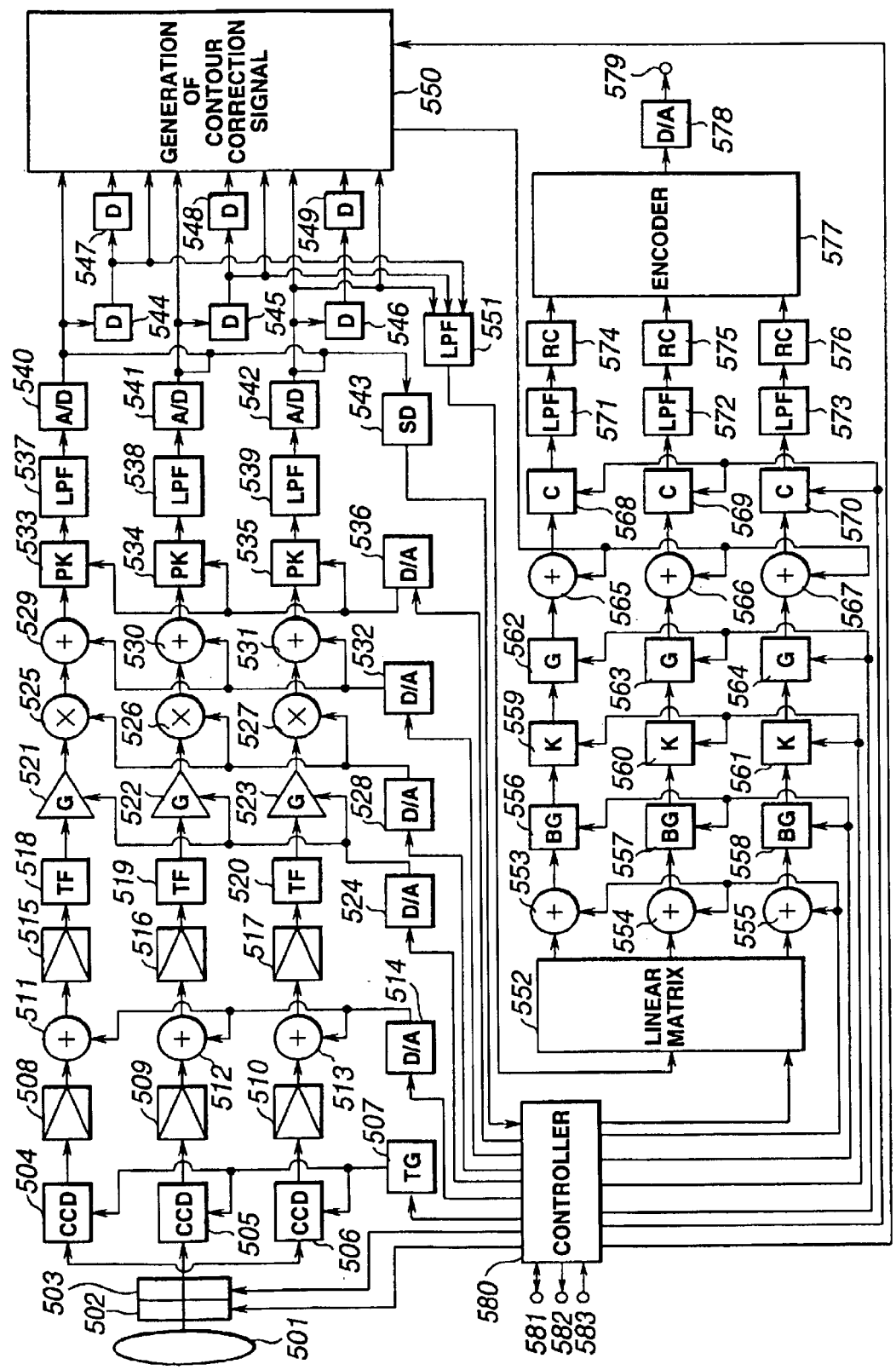
FIG. 34 illustrates an example of an inner structure of a picture system of a camera device.

FIG. 34 illustrates an internal structure of a video system of the camera device 1000 shown in FIG. 1.
[Connection and Structure]

The video system of the camera 1000 includes an objective lens 501, a CC filter 502, an ND filter 503 and CCDs 504 to 506 for R, G and B. The video system also includes amplifier circuits 508 to 510 and addition circuits 511 to 513 for black set and black shading adjustment. The video system also includes amplifier circuits 515 to 517 and trap filters 518 to 520. The video system also includes gain control amplifier circuits 521 to 523 and multiplier circuits 525 to 527 for white shading adjustment. The video system also includes addition circuits 529 to 531 for flare adjustment and pre-knee circuits 533 to 535 for pre-knee control. The video system also includes digital low-pass filters 537 to 539 and A/D converters 540 to 542. The video system also includes 1H delay circuits 544 to 549 and a contour correction signal generating circuit 550. The video system also includes a digital low-pass filter 551 and a linear matrix circuit for rolling for matrix control 552. The video system also includes addition circuits 553 to 555 for pedestal (black) control and black gamma correction circuits 556 to 558 for black gamma control. The video system also includes knee correction circuits 559 to 561 for knee control and gamma correction circuits 562 to 564 for gamma correction. The video system also includes addition circuits for contour correction 565 to 567 and black/white clip circuits 568 to 570 for black/white clip control. The video system also includes digital low-pass filters 571 to 573 and rate converters 574 to 576 for sampling rate conversion. The video system also includes an encoder 577 for obtaining composite video signals of the NTSC or PAL system, a D/A converter 578 and a controller 578 for obtaining composite video signals of the NTSC or PAL system and a timing generator 507. The video system further includes D/A converters 514, 524, 528, 532 and 536 and a shading detection circuit 543.

The input/output terminal 581 is connected to the controllers 1200-1, . . . , 1200-n shown in FIG. 1, while the output terminal 582 s connected to a display signal input terminal of the LCD 700 shown in FIG. 1 and the input terminal 583 is connected to a data output terminal of the set of the actuating keys 750 shown in FIG. 1.

[Operation for Parameter Setting]

The controller 580 accepts the machine type ID data, command data, parameter ID data and parameter data supplied from the computer shown in FIG. 1 via system controller 1100 and controller 1200-1 and the input/output terminal 581. The controller 580 decides whether or not the transmitted data is data addressed thereto, based on the machine type ID data. In addition, the controller recognizes, based on the contents of the command data, which processing should be executed, and performs control corresponding to the parameter data on parameters as indicated by the parameter ID data.

Specifically, the controller 580 supplies a CC filter control signal to the CC filter 502 to control the CC filter 502, while supplying an ND filter control signal to the ND filter 503 to control the ND filter 503. Morever, the controller 580 supplies a shutter control signal to the timing generator 507 for supplying a CCD drive control signal from the timing generator 507 to the CCDs 504 to 506 to control the shutter.

Moreover, the controller 508 supplies the black set and black shading signal via D/A converter 514 to the addition circuits 511, 512 and 513 while also supplying a gain control signal via D/A converter 524 to the gain control amplifier circuits 521 to 523. The controller 580 also supplies the white shading control signal via D/A converter 528 to the multiplication circuits 525 to 527, while supplying a flare control signal via D/A converter 532 to the addition circuits 29 to 531 and supplying a pre-knee control signal via D/A converter 536 to the pre-knee circuits 533 to 535.

The controller 580 also accepts, for control purposes, shading data obtained on detection by the shading detection circuit 543 based on output data of the A/D converters 540 to 542.

The controller 580 sends a detail control signal to a contour correction signal generating circuit 550. This causes the contour correction signal generating circuit 550 to send detail data to the addition circuits 565 to 567. Moreover, the controller 580 supplies a matrix control signal to the linear matrix circuit 552, while supplying a pedestal (black) control signal to the addition circuits 553 to 555. The controller 580 also supplies a black gamma control signal to the black gamma correction circuits 556 to 558 while supplying a knee control signal to the knee correction circuits 559 to 561. The controller 580 also supplies a gamma control signal to the gamma correction circuits 562 to 564, while supplying a black/white clip control signal to the black/white clip circuits 568 to 570.

21. Explanation of the Structure of an Audio System of the Camera Shown in FIG. 1 (see FIG. 35)

Figure 35:
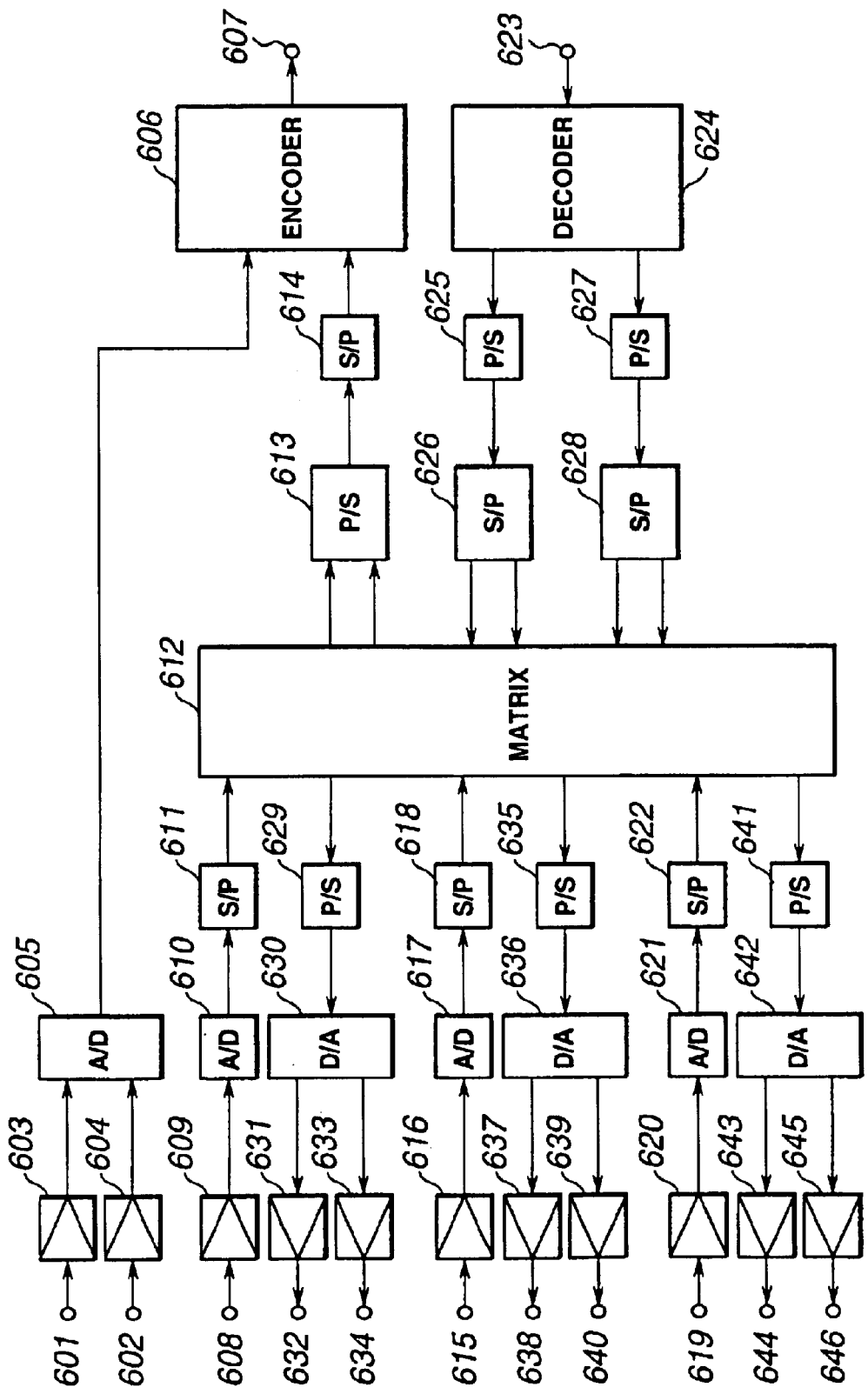
FIG. 35 illustrates an example of an inner structure of a picture system of a speech system of the camera device.

FIG. 35 illustrates a example of an inner structure of an audio system of the camera device 1000 shown in FIG. 1.

This audio system includes a processing system for an input audio signal from the microphone 850 shown in FIG. 1 and the line, a first processing system INCOM-1 for the first input audio signal, a second processing system INCOM-2 for the input audio signal, a processing system Tracker for the third input audio signal, a processing system INCOM-1 for the first output audio signal for the inter-cam of the camera device 1000 shown in FIG. 1, a second processing system for the second output audio signal INCOM-2, a third processing system for the third output audio signal INCOM-3 (tracker), an output system PGM-1 of the first program output audio signal to the inter-cam of the camera device 1000 shown in FIG. 1, an output system PGM-2 of the second program output audio signal, an output system PGM-3 of the third program output audio signal, a matrix circuit 612, parallel/serial conversion circuits 613, 625, 627, serial/parallel conversion circuits 626, 628, 614, an encoder 606 and a decoder 624.

The processing system NIC/LINE of the input audio signal includes an amplifier 603 for amplifying the input audio signal from the microphone 850 shown in FIG. 1 or the line via input terminal 601, an amplifier circuit 604 for amplifying the input audio signal from the microphone 850 shown in FIG. 1 or the line via input terminal 602 and an A/D converter 605 for converting the resulting outputs into digital audio signals.

The processing system INCOM-1 for the first input audio signal includes an amplifier circuit 609 for amplifying the first input audio signal supplied via input terminal 608 from the inter-cam of the camera device 1000 shown in FIG. 1, an A/D converter 610 for converting an output of the amplifier circuit 609 into a digital audio signal and a serial/parallel conversion circuit 611 for converting an output of the A/D converter 610 into a parallel digital audio signal.

The processing system INCOM-2 for the second input audio signal includes an amplifier circuit 616 for amplifying the second input audio signal supplied via input terminal 615 from the inter-cam of the camera device 1000 shown in FIG. 1, an A/D converter 617 for converting an output of the amplifier circuit 616 into a digital audio signal and a serial/parallel conversion circuit 618 for converting an output of the A/D converter 617 into a parallel digital audio signal.

The processing system INCOM-1 for the third input audio signal includes an amplifier circuit 620 for amplifying the first input audio signal supplied via input terminal 619 from the inter-cam of the camera device 1000 shown in FIG. 1, an A/D converter 621 for converting an output of the amplifier circuit 620 into a digital audio signal and a serial/parallel conversion circuit 622 for converting an output of the A/D converter 621 into a parallel digital audio signal.

The processing system INCOM-1 for the first output audio signal includes a parallel/serial conversion circuit 629 for converting the parallel digital audio signal from the matrix circuit 612 into a serial digital signal, a D/A converter 630 for converting an output of the conversion circuit 629 into an analog signal, and an amplifier circuit 631 for amplifying an output audio signal of the D/A converter 630 to output the amplified signal via output terminal 632 to an inter-cam of the camera device 1000 shown in FIG. 1.

The processing system INCOM-2 for the second output audio signal includes a parallel/serial conversion circuit 635 for converting the parallel digital audio signal from the matrix circuit 612 into a serial digital signal, a D/A converter 636 for converting an output of the conversion circuit 635 into an analog signal, and an amplifier circuit 637 for amplifying an output audio signal of the D/A converter 636 to output the amplified signal via output terminal 638 to an inter-cam of the camera device 1000 shown in FIG. 1.

The processing system INCOM-3 for the third output audio signal includes a parallel/serial conversion circuit 641 for converting the parallel digital audio signal from the matrix circuit 612 into a serial digital signal, a D/A converter 642 for converting an output of the conversion circuit 641 into an analog signal, and an amplifier circuit 643 for amplifying an output audio signal of the D/A converter 642 to output the amplified signal via output terminal 644 to an inter-cam of the camera device 1000 shown in FIG. 1.

The processing system PGM-1 for the first program output audio signal includes a parallel/serial conversion circuit 629 for converting the parallel digital audio signal from the matrix circuit 612 into a serial digital signal, a D/A converter 630 for converting an output of the conversion circuit 629 into an analog signal, and an amplifier circuit 633 for amplifying an output audio signal of the D/A converter 630 to output the amplified signal via output terminal 634 to an inter-cam of the camera device 1000 shown in FIG. 1.

The processing system PGM-2 for the second program output audio signal includes a parallel/serial conversion circuit 635 for converting the parallel digital audio signal from the matrix circuit 612 into a serial digital signal, a D/A converter 636 for converting an output of the conversion circuit 635 into an analog signal, and an amplifier circuit 639 for amplifying an output audio signal of the D/A converter 636 to output the amplified signal via output terminal 640 to an inter-cam of the camera device 1000 shown in FIG. 1.

The processing system PGM-3 for the third program output audio signal includes a parallel/serial conversion circuit 641 for converting the parallel digital audio signal from the matrix circuit 612 into a serial digital signal, a D/A converter 642 for converting an output of the conversion circuit 641 into an analog signal, and an amplifier circuit 645 for amplifying an output audio signal of the D/A converter 642 to output the amplified signal via output terminal 646 to an inter-cam of the camera device 1000 shown in FIG. 1.

Based on a control signal from the controller 580 shown in FIG. 29, the matrix circuit 612 mixes three input audio signals from the serial/parallel conversion circuits 611, 618 and 622, while also mixing audio signals of the INCOM-1 and INCOM-2 supplied from the input terminal 623 as AUXIN and thence supplied to a decoder 624 for conversion from the vide signal rate to the audio signal rate so as to be processed by the serial/parallel conversion circuit s 626, 628 with the audio signals from the PGM-1 and PGM-2. In the encoder 606, the MIC/LINE audio signal from the A/D converter 605 and the audio signals outputted by the matrix circuit 612 so as to be then converted into a serial signal by the parallel/serial conversion circuit 614 and re-converted into a parallel signal by the serial/parallel conversion circuit 614 are converted from the audio signal rate to the video signal rate so as to be outputted at an output terminal 607 as AUXOUT.

The serial/parallel conversion circuit s 611, 618, 622, 626, 628, matrix circuit 612 and the parallel/serial conversion circuits 629, 635, 641 and 613 are integrated to a sole LSI. On the other hand, the serial/parallel conversion circuit 614, parallel/serial conversion circuits 625 and 627, encoder 606 and the decoder 624 are integrated t optical axis sole LSI.

The present invention is not limited to the above-described embodiments in the absence of contrary statements. For example, although the range of variation can be limited only with respect to the master black, there is no particular limitation provided the various functions proper to the camera device 1000 can be limited by the computer 100.

What is claimed is:

1. An imaging system having at least one camera device for performing pre-set signal processing on an imaging signal generated responsive to imaging light of an object and a camera controller for adjusting various functions of the camera device; said camera controller comprising:

operating means;

memory means for holding in memory a file stating items of the controllable ranges of said functions, each of said controllable ranges being defined by a maximum value and a minimum value and being indicative of the range of values within which the value of a particular function may be set to at any given time, whereby at least one of said controllable ranges may be set such that it is not equal to the full adjustable range of the corresponding function as defined by said camera device; and control means for reading out said file from said memory means for controlling said camera device so that the functions of the items stated in said file will be adjusted responsive to setting input of said operating means, wherein said control means controls said camera device so that, if an item of said file is deleted based on a setting input of said operating means, the functions of the deleted item will be held in the initial setting state;

whereby said file is communicated from said memory means to said control means via a data converter that is operable to perform protocol conversion on said file, and said data converter is operable to convert data among more than two protocols.

2. The imaging system as claimed in claim 1 wherein said camera controller includes display means for displaying at least the items of said functions;

said control means controlling said display means so that, if the item of said file is deleted based on the setting input of said operating means, the deleted setup item and the undeleted setup item are displayed in a discriminated state from each other.

3. The imaging system as claimed in claim 1 wherein said control means controls the camera device so that, if the controllable ranges of said various functions of said file are changed on the basis of the setting input of said operating means, the various functions can be adjusted within the changed controllable ranges.

4. The imaging system as claimed in claim 3 wherein said control means controls said display means so that, if the controllable ranges of said functions of said file are changed on the basis of the setting of said operating means, said controllable ranges will be displayed.

5. The imaging system as claimed in claim 1 wherein said memory means holds on memory the file stating controllable ranges of all functions of said camera device.

6. The imaging system as claimed in claim 1 wherein said memory means holds on memory the file stating controllable ranges of optional functions of said camera device.

7. A method for controlling an imaging system comprising the steps of:

reading out a file stating items of controllable ranges of functions of a camera device, each of said controllable ranges being defined by a maximum value and a minimum value and being indicative of the range of values within which the value of a particular function may be set to at any given time, whereby at least one of said controllable ranges may be set such that it is not equal to the full adjustable range of the corresponding function as defined by said camera device;

rewriting the read-out file responsive to operating setting of operating means; and controlling the camera device so that the functions of the items stated in the rewritten file will be adjusted responsive to setting of said operating means, wherein, if an item of said file is deleted responsive to setting of said operating means, said camera device is controlled so that the functions of the deleted item will be held in the initial setting state;

whereby a protocol conversion is performed on said file prior to using the file in said controlling step, and said data converter is operable to convert data among more than two protocols.

8. The method for controlling the imaging system as claimed in claim 7 wherein at least items of said functions are displayed on display means, and wherein said display means are controlled so that, if the item of said file is deleted based on the setting input of said operating means, the deleted setup item and the undeleted setup item are displayed in a discriminated state from each other.

9. The method for controlling the imaging system as claimed in claim 7 wherein the camera device is controlled so that, if the controllable ranges of said various functions of said file are changed on the basis of the setting input of said operating means, the various functions can be adjusted within the changed controllable ranges.

10. The method for controlling an imaging system as claimed in claim 9 wherein at least the items of said functions are displayed on display means and wherein, if the controllable ranges of said functions of said file are changed on the basis of the setting of said operating means, said display means is controlled for displaying said changed controllable ranges.

* * * * *